United States Patent
Anand

(10) Patent No.: US 12,032,682 B2
(45) Date of Patent: Jul. 9, 2024

(54) SYSTEMS AND METHODS FOR IMPROVING ACCURACY IN RECOGNIZING AND NEUTRALIZING INJECTION ATTACKS IN COMPUTER SERVICES

(71) Applicant: Imperva, Inc., San Mateo, CA (US)

(72) Inventor: Kunal Anand, Marina Del Rey, CA (US)

(73) Assignee: Imperva, Inc., San Mateo, CA (US)

( * ) Notice: Subject to any disclaimer, the term of this patent is extended or adjusted under 35 U.S.C. 154(b) by 46 days.

(21) Appl. No.: 17/388,001

(22) Filed: Jul. 28, 2021

(65) Prior Publication Data

US 2022/0019658 A1 Jan. 20, 2022

Related U.S. Application Data

(60) Division of application No. 16/015,980, filed on Jun. 22, 2018, now Pat. No. 11,100,218, which is a
(Continued)

(51) Int. Cl.
| | | |
|---|---|---|
| *G06F 21/54* | (2013.01) | |
| *G06F 21/55* | (2013.01) | |
| *H04L 9/40* | (2022.01) | |

(52) U.S. Cl.
CPC ............ *G06F 21/54* (2013.01); *G06F 21/554* (2013.01); *H04L 63/1416* (2013.01); *H04L 63/1466* (2013.01); *G06F 2221/031* (2013.01)

(58) Field of Classification Search
CPC ........ G06F 21/54; G06F 21/554; G06F 21/56; G06F 21/125
See application file for complete search history.

(56) References Cited

U.S. PATENT DOCUMENTS

| | | |
|---|---|---|
| 5,742,806 A | 4/1998 | Reiner et al. |
| 7,437,362 B1 | 10/2008 | Ben-Natan |

(Continued)

OTHER PUBLICATIONS

Advisory Action U.S. Appl. No. 16/015,980, dated Jun. 4, 2020, 3 pages.
(Continued)

*Primary Examiner* — Dao Q Ho
(74) *Attorney, Agent, or Firm* — Nicholson, De Vos, Webster & Elliott, LLP

(57) ABSTRACT

Systems and methods for analyzing SQL queries for constraint violations for injection attacks. Tokenizing a SQL query generates a token stream. A parse tree is constructed by iterating over lexical nodes of the token stream. The parse tree is compared to a SQL schema and access configuration for a database in order to analyze the SQL query for constraint violations. Evaluation flaws are also detected. A step-wise, bottom-up approach is employed to walk through the parse tree to detect types and to ascertain from those types whether the condition for SQL execution is static or dynamic. SQL request security engine logic refers to predetermined protective action data and takes the particular type of action specified by the predetermined protective action data. Security is further enhanced by limiting service of requests to requests of one or more specific, accepted data types. Each request is parsed into individual data elements, each an associated key-value pair. If the key is any data element of the request matches a predetermined allowed key, detection and neutralization of any injection attack in the associated value data of the data element is bypassed. A number of patterns that match information to be obscured in logs are established and any matching information is replaced with obscured data. When recording information to the logs, any data whose key is a predetermined masked key is replaced with obscured data.

6 Claims, 22 Drawing Sheets

Related U.S. Application Data continuation-in-part of application No. 15/268,510, filed on Sep. 16, 2016, now Pat. No. 10,025,936, which is a continuation-in-part of application No. 14/599,978, filed on Jan. 19, 2015, now Pat. No. 9,519,774.

(60) Provisional application No. 62/220,903, filed on Sep. 18, 2015, provisional application No. 61/929,474, filed on Jan. 20, 2014.

(56) References Cited

U.S. PATENT DOCUMENTS

| | | | |
|---|---|---|---|
| 8,225,402 | B1 | 7/2012 | Averbuch et al. |
| 10,002,254 | B2 | 6/2018 | Anand et al. |
| 11,100,218 | B2 * | 8/2021 | Anand ............... H04L 63/1466 |
| 2002/0078406 | A1 * | 6/2002 | Kondoh .................... G06F 8/33 714/48 |
| 2004/0111642 | A1 * | 6/2004 | Peles ................... H04L 63/0218 726/4 |
| 2005/0149552 | A1 * | 7/2005 | Chan ..................... G06F 16/211 707/999.102 |
| 2005/0160101 | A1 * | 7/2005 | Gallagher ............. G06F 16/284 |
| 2005/0203921 | A1 | 9/2005 | Newman et al. |
| 2006/0212438 | A1 | 9/2006 | Ng |
| 2007/0208693 | A1 | 9/2007 | Chang et al. |
| 2009/0049547 | A1 | 2/2009 | Fan |
| 2009/0150374 | A1 * | 6/2009 | Dewey .................. G06F 21/562 707/999.005 |
| 2010/0094765 | A1 | 4/2010 | Nandy |
| 2010/0228693 | A1 | 9/2010 | Dawson et al. |
| 2011/0225647 | A1 | 9/2011 | Dilley et al. |
| 2011/0258704 | A1 | 10/2011 | Ichnowski |
| 2012/0192280 | A1 | 7/2012 | Venkatakrishnan et al. |
| 2013/0312103 | A1 * | 11/2013 | Brumley ............... G06F 21/577 726/25 |
| 2015/0205951 | A1 | 7/2015 | Anand et al. |
| 2016/0055026 | A1 * | 2/2016 | Fitzgerald .......... H04L 63/1433 718/1 |
| 2018/0084007 | A1 * | 3/2018 | Dinerstein .......... H04L 63/1466 |
| 2022/0019658 | A1 * | 1/2022 | Anand ................ H04L 63/1466 |

OTHER PUBLICATIONS

Buehrer et al., "Using Parse Tree Validation to Prevent SQL injection Attacks", In: International Workshop on Software Engineering and Middleware, ACM, Sep. 2005, 8 pages.

Final Office Action, U.S. Appl. No. 16/015,980, dated Mar. 30, 2020, 9 pages.

Halfond et al., "AMNESIA: Analysis and Monitoring for NEutralizing SQL-Injection Attacks", ACM, ASE'05, Nov. 2005, 10 pages.

International Preliminary Report on Patentability, PCT App. No. PCT/US15/12082, dated Aug. 4, 2016, 8 pages.

International Preliminary Report on Patentability, PCT App. No. PCT/US16/52387, dated Mar. 29, 2018, 9 pages.

International Search Report and Written Opinion, PCT App. No. PCT/US15/12082, dated Apr. 24, 2015, 8 pages.

International Search Report and Written Opinion, PCT App. No. PCT/US16/52387, dated Dec. 28, 2016, 9 pages.

Non-Final Office Action, U.S. Appl. No. 14/599,978, dated Feb. 25, 2016, 10 pages.

Non-Final Office Action, U.S. Appl. No. 15/268,503, dated Jun. 27, 2017, 12 pages.

Non-Final Office Action, U.S. Appl. No. 15/268,510, dated Jun. 27, 2017, 11 pages.

Non-Final Office Action, U.S. Appl. No. 16/015,980, dated Dec. 2, 2019, 10 pages.

Non-Final Office Action, U.S. Appl. No. 16/015,980, dated Sep. 30, 2020, 8 pages.

Notice of Allowance, U.S. Appl. No. 14/599,978, dated Aug. 9, 2016, 14 pages.

Notice of Allowance, U.S. Appl. No. 15/268,503, dated Feb. 23, 2018, 14 pages.

Notice of Allowance, U.S. Appl. No. 15/268,510, dated Mar. 23, 2018, 14 pages.

Notice of Allowance, U.S. Appl. No. 16/015,980, dated May 11, 2021, 10 pages.

Requirement for Restriction/Election U.S. Appl. No. 16/015,980, dated Oct. 4, 2019, 7 pages.

Thomas et al., "On automated prepared statement generation to remove SQL injection vulnerabilities", Information and Software Technology, vol. 51, 2009, pp. 589-598.

* cited by examiner

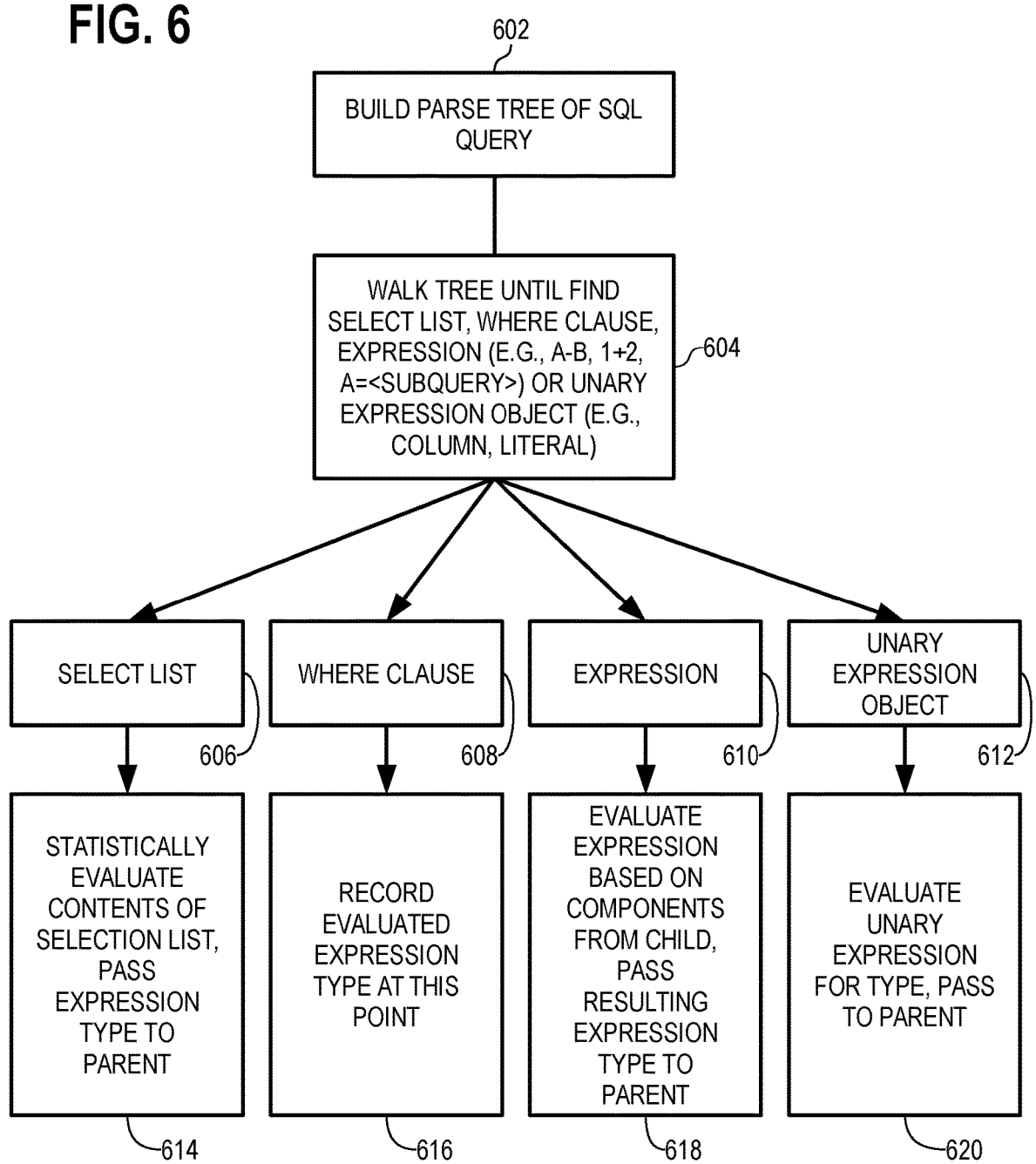

SYSTEMS AND METHODS FOR IMPROVING ACCURACY IN RECOGNIZING AND NEUTRALIZING INJECTION ATTACKS IN COMPUTER SERVICES

CROSS-REFERENCE TO RELATED APPLICATIONS

This application is a Divisional and claims the benefit of application Ser. No. 16/015,980, filed Jun. 22, 2018, now U.S. Pat. No. 11,100,218, issued Aug. 24, 2021, which is a Continuation-in-Part of and claims the benefit of U.S. application Ser. No. 15/268,510, filed Sep. 16, 2016, now U.S. Pat. No. 10,025,936, issued Jul. 17, 2018, which application claims the benefit of U.S. Provisional Application No. 62/220,903, filed Sep. 18, 2015. Also, application Ser. No. 15/268,510 is a Continuation-in-Part of and claims the benefit of U.S. application Ser. No. 14/599,978, filed Jan. 19, 2015, now U.S. Pat. No. 9,519,774, issued Dec. 13, 2016, which application claims the benefit of U.S. Provisional Application No. 61/929,474, filed Jan. 20, 2014, all applications/patents listed are incorporated herein in their entirety by this reference.

BACKGROUND

The present invention relates to systems and methods for preventing malicious attacks on relational database management systems (RDBMS). In particular, the present systems and methods include novel means for determining the likelihood of a structured query language (SQL) injection attack and other security risks.

With the proliferation of online activity, there has been an equally robust increase in the numbers of attacks. These attacks enable malicious parties to gain personal (and potentially sensitive) information on individuals, redirect users to malicious websites, track their browsing, and otherwise take advantage of users, often without them being aware of the attack.

One common vector of attacks is SQL injection. SQL injection is designed to tamper or steal sensitive information from data-driven web applications. This is accomplished by providing fragments of a SQL query into an input variable, supplied by a web application user. When the input is evaluated by the application, the tainted SQL query is executed, allowing attackers to CRUD (create, read, update, delete) information from a database.

There are limited methods currently employed to avert SQL injection attacks. Rarely are there requirements placed on SQL entries that attempt to redress SQL injection attacks. More often blacklists, in the form of string replacements and regular expressions, are employed to restrict known threats from accessing the databases. However, generally, there is insufficient means for accurately assessing the risk of a SQL query and especially, an input variable that may contain a SQL query.

It is therefore apparent that an urgent need exists for improved systems and methods for analyzing SQL queries in order to identify potential injection attacks. Such systems and methods enable the generation of reports on the SQL query which may be employed for attack prevention.

SUMMARY

To achieve the foregoing and in accordance with the present invention, systems and methods for analyzing SQL queries for constraint violations, which may indicate injection attacks. Such systems and methods enable the identification and possibly prevention, of such attacks. This increases database security where employed.

In some embodiments, the systems and methods tokenizing a SQL query to generate a token stream. Next lexical nodes are generated by iterating over the token stream. Then a parse tree can be constructed by iterating over the lexical nodes. The parse tree may be compared to a SQL schema and access configuration for a database in order to analyze the SQL query for constraint violations.

The analyzing for constraint violations includes determining the number of queries in the parse tree. This may be performed by identifying multiple SQL statements, delineating by a query separator or identifying sub-queries in relevant query commands and operators.

Another constraint violation analyzed for is identifying invalid fields and table access. This is determined by identifying parse tree identifiers for fields or tables that do not exist or for which access is restricted. In a similar vein, identifying invalid field type comparisons and pattern matches may also be performed. This includes identifying where the field input mismatches the SQL query function, or where field are compared by the SQL query which are restricted from being compared by the access configuration.

Identifying early statement termination is another constraint violation which may be analyzed for. A report of all the constraint violations may be output. In other embodiments, remedial measures may be taken to reduce risk exposure for SQL queries that are likely harboring a SQL injection attack. It is also possible to analyze for the presence of a comment, which can be a possible early termination, a possible excising of standard query structure, or extraneous unused content present in the query. Possible early termination or possible excising of standard query structure may be thought of as attack vectors. Extraneous unused content may be thought of as resulting in inefficient, unneeded data transfer to the query engine.

Embodiments of the invention also pertain to detecting evaluation flaws (i.e., tautologies, contradictions, and coding inefficiencies). In one or more embodiments, the structure of the parse tree and a step-wise, bottom-up approach is employed to walk through the parse tree to detect types and to ascertain from those types whether the condition for SQL execution is static or dynamic. If the condition for SQL execution is static, the SQL statement is marked for further evaluation for possible evaluation flaws. In other embodiments, the structure of the parse tree and a step-wise, bottom-up approach is employed to walk through the parse tree to evaluate for values and to ascertain from those values whether the condition for SQL execution is always true or always false or a coding error. If the condition for SQL execution is always true, a tautology is said to exist. If the condition for SQL execution is always false, a contradiction is said to exist.

The most appropriate action to take in response to detection of injection attacks and other flaws in requests to be processed by a server computer system can vary from computer service to computer service. Accordingly, SQL request security engine logic refers to predetermined protective action data and takes the particular type of action specified by the predetermined protective action data. The predetermined protective action data is generated in response to physical manipulation of one or more user input devices by a human user. The particular type of action taken can be to refuse to serve the request and report an error in response or to render any injection attack in the request inoperative, e.g., by modifying or removing active elements injected into the request.

Security is further enhanced by limiting service of requests to requests of one or more specific, accepted data types. Upon receiving a request for service at a server computer system, the server computer system identifies the particular data type of the request from metadata of the request. If the request is of an accepted data type, the server computer system processes the request normally, rendering any detected injection attack in the request inoperative, e.g., by modifying or removing active elements injected into the request. If the request is not of an accepted data type, the server computer system can refuse to serve the request and report an error in response. This action is best for requests of non-accepted data types if the safety of serving the request of its particular data type is difficult or impractical. Alternatively, the server computer system can serve the request without attempting detection and neutralization of injection attacks if the request is not of an accepted data type. This action is best for requests of non-accepted data types if requests of this particular data type cannot include effective injection attacks. This can be the case if the server computer system simply cannot process requests of this data type, the server computer system processes requests of this data type in a manner that any injected computer instructions will not be executed, or the particular data type is believed to be incapable of carrying injection attacks.

In some environments, it is not desirable to treat all data the same in terms of detecting and neutralizing injection attacks. Attacks injected into requests generally rely on the inadvertent executing of computer instructions injected into the request where computer instructions are not expected. For many attacks, an attempt to display data with injected computer instructions can cause the computer instructions to be executed. However, some data in a request is processes in such a manner that any computer instruction injected into the data would never be executed and modifying or removing portions of the data that may be erroneously identified as an injection attack can adversely affect services of the request. A common example is a password. Passwords are used in a very specific and limited context, e.g., for authentication by comparison to a predetermined expected password. Passwords generally are not displayed and therefore are not significant candidates for injection attacks. In addition, any modification of a password in response to erroneous detection of an injection attack can improperly cause authentication to fail.

Accordingly, detection and neutralization of injection attacks can be controlled at the level of individual data elements of the request. The server computer system parses each request into individual data elements, each an associated key-value pair. If the key is any data element of the request matches a predetermined allowed key, detection and neutralization of any injection attack in the associated value data of the data element is bypassed. Thus, injected attack protection can be enabled or disabled for individual data elements of a request to improve the performance of the server computer system.

Generally, all or most actions taken by a server computer system in serving requests is recorded in logs, i.e., collections of data representing details of the actions taken by the server computer system. These logs can be helpful in troubleshooting errors, answering questions by human users/clients as to what events might have transpired, or identifying areas of processing by the server computer system that could benefit from improvement and increased efficiency. In pursuits of such evaluation of the processing performed by the server computer system, it's not uncommon for logs to be shared with people and/or computer systems tasked with these pursuits. However, requests processed by the server computer system can include highly sensitive information that (i) is not required for such pursuits and (ii) should not be so widely distributed. Accordingly, obscuring such sensitive information in such logs can better protect such sensitive information and/or, by allowing wider distribution of the logs, can significantly facilitate such pursuits.

Sensitive information that takes a predictable and recognizable format is obscured in the logs. In particular, a number of patterns that match information to be obscured are established. When recording information to the logs, any data matching any pattern is replaced with obscured data. For example, U.S. social security numbers today follow a specific and recognizable pattern of, in sequence, three (3) digits, a hyphen, two (2) digits, a hyphen, and four (4) digits. To obscure social security numbers in logs, a pattern specifying that sequence of digits and hyphens is established such that any and all occurrences of that sequence in data to be recorded to the logs is replaced with obscured data, e.g., "****".

Some sensitive data doesn't follow any particular pattern but can be identified by metadata associated with the sensitive data. For example, most data exchanged in requests and responses today is organized hierarchically and/or is in the form of associated key-value pairs. Hierarchical relationships can be defined by associating, with a key, value data in the form of one or more key-value pairs. Each key is a form of metadata in that the key tells us something about the associated value and how it is to be used.

An example of sensitive data that can be identified by its metadata is a user's password. If a server computer system associates a user's password with the key of "password", the server computer system can reliably treat any data whose key is "password" as sensitive. The data need not follow any recognizable pattern and, in fact, can be any data at all that can serve as the value associated with the key of "password".

Keys whose associated values are sensitive and should be obscured in logs are predetermined to be masked keys. When recording information to the logs, any data whose key is a predetermined masked key is replaced with obscured data, e.g., "****".

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which:

FIG. 6 shows, in accordance with an embodiment of the invention, a flow diagram for evaluating expression types via SQL parse tree reversal;

DETAILED DESCRIPTION

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

The present invention relates to novel systems and methods for identifying and preventing attacks on databases via SQL injection. Unlike previous systems that utilize blacklists or other rudimentary means for restricting access to these databases, the present system utilizes a process for analyzing SQL queries in order to identify characteristics that indicate that the query may include an attack. The resulting reports of the SQL query may indicate the likelihood that the query is valid versus a potential security risk. These reports may be utilized to drive mitigation policies; which enables a higher degree of protection for databases.

Figure 1:
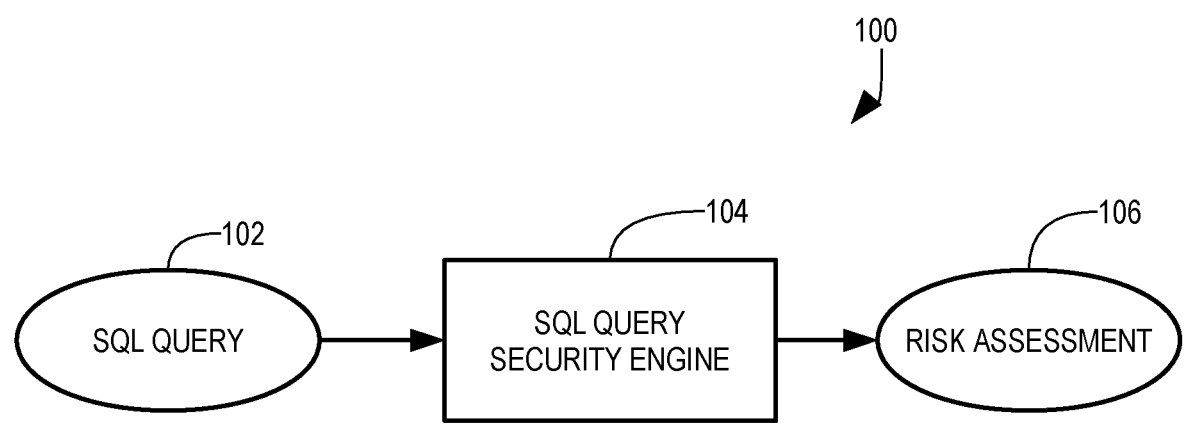
FIG. 1 is a schematic block diagram for the system for SQL query security, in association with some embodiments.

Turning to FIG. 1, shown generally at 100, the system includes an incoming SQL query 102 which is filtered through a SQL query security engine 104. The SQL query security engine 104 may analyze the SQL query 102 to determine the degree of risk of an injection attack the query poses. The output of the SQL query security engine 104 is a risk assessment report 106.

In some embodiments, this risk assessment may merely include a summary report of the security-specific analytics. The end-user/application may then utilize this assessment to apply their own policies regarding SQL risks, and implement a customized mitigation strategy.

In alternate embodiments, the SQL query security engine 104 may actively block the SQL query, or otherwise sterilize it, when particular risk profiles are reached. For example, if an SQL query includes a request to access multiple fields in a database table, and some of the indicated fields are restricted fields, the system may outright restrict the query, or only return the unrestricted data, dependent upon risk profiles and/or configuration of the risk mitigation.

Figure 2:
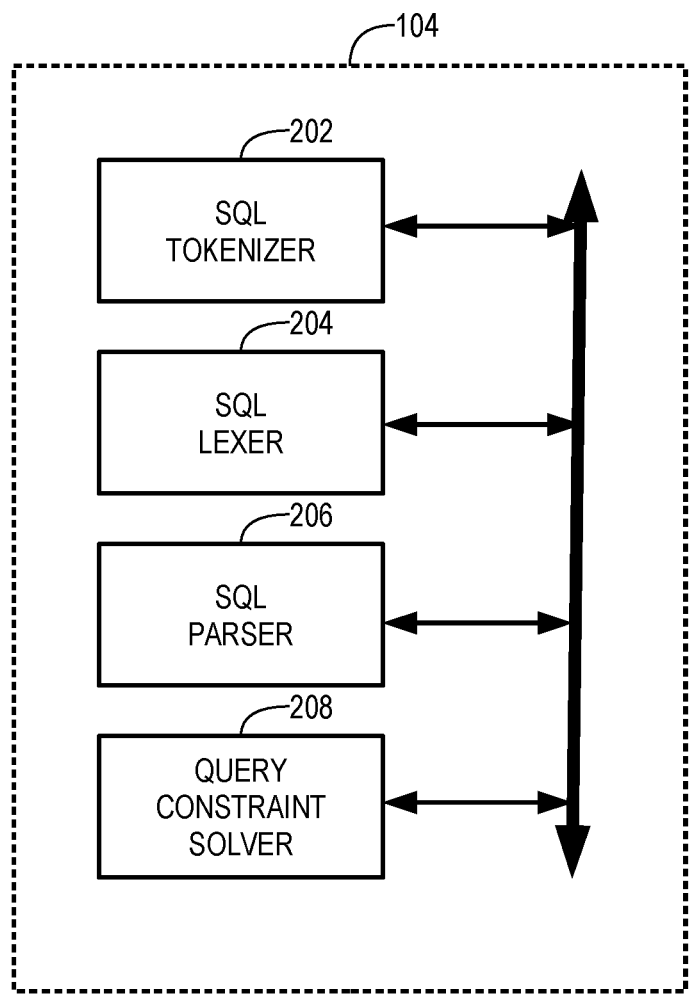
FIG. 2 is a more detailed schematic block diagram for the subcomponents of the SQL security system, in association with some embodiments.

FIG. 2 provides a more detailed view of the subcomponents of the SQL query security engine 104. These include a SQL tokenizer 202, a SQL lexer 204, a SQL parser 206, and a query constraint solver 208. Each of these components may be logically or physically coupled to one another.

In order for constraint solving to be performed, the SQL query must first be converted into a valid parse tree. The development of a valid parse tree is known, and may be accomplished in a number of ways. However, for the sake of this disclosure, one example of the construction of a parse tree will be provided for clarity.

An SQL query may be stand alone or may be within the context of another string. The SQL query is constructed as a sequence of bytes with a provided encoding (e.g., ASCII, Latin-1, or UTF-8). The encoding is needed for knowing how to tokenize the SQL query. The SQL tokenizer 202 consumes the byte sequence and produces a token stream. The token stream is a stream of characters, numbers and punctuation. More specifically, the token stream is an ordered stream of tokens, which are themselves composed of 0 or more characters, numbers, punctuation or symbols paired with their lexer-determined token type.

The SQL lexer 204 iterates over the token stream to produce a tree of lexical nodes. This process basically chunks the token stream into SQL commands, SQL functions and field/table identifiers, for example.

The SQL parser 206 iterates over the lexical nodes to determine query structure and validity (i.e., fits the rules for a valid SQL statement). This results in a parse tree. As previously mentioned, the generation of a parse tree from a SQL query is known, and as such description of these processes are left purposefully broad as to not over-clutter the disclosure with extraneous verbiage.

Once the parse tree is derived, however, the query constraint solver 208 may perform novel analysis on the SQL query to determine its risk profile. The query constraint solver 208 utilizes the parse tree as an input, and also utilizes a SQL schema, and an access configuration for the database as reference. The SQL schema includes a breakdown of the existing database tables with their corresponding fields and type information. The query constraint solver 208 compares the SQL query parse tree to the schema and access configurations to determine the number of queries, invalid field access, invalid field type comparisons, and early statement terminations. Each of these activities is an indicator of a SQL injection attack. The results of the analysis may be reported in raw form, or may be compared against risk profiles in order to generate a risk value for the query. In some cases, the risk value may be a simple 'high, medium, low' risk designation. In alternate embodiments, a percentile, or other indicator, may be provided for the query indicating its likelihood of harboring an injection attack. Although the schema and access configuration are not always required, their use allows for more detailed security reports to be generated.

Figure 3:
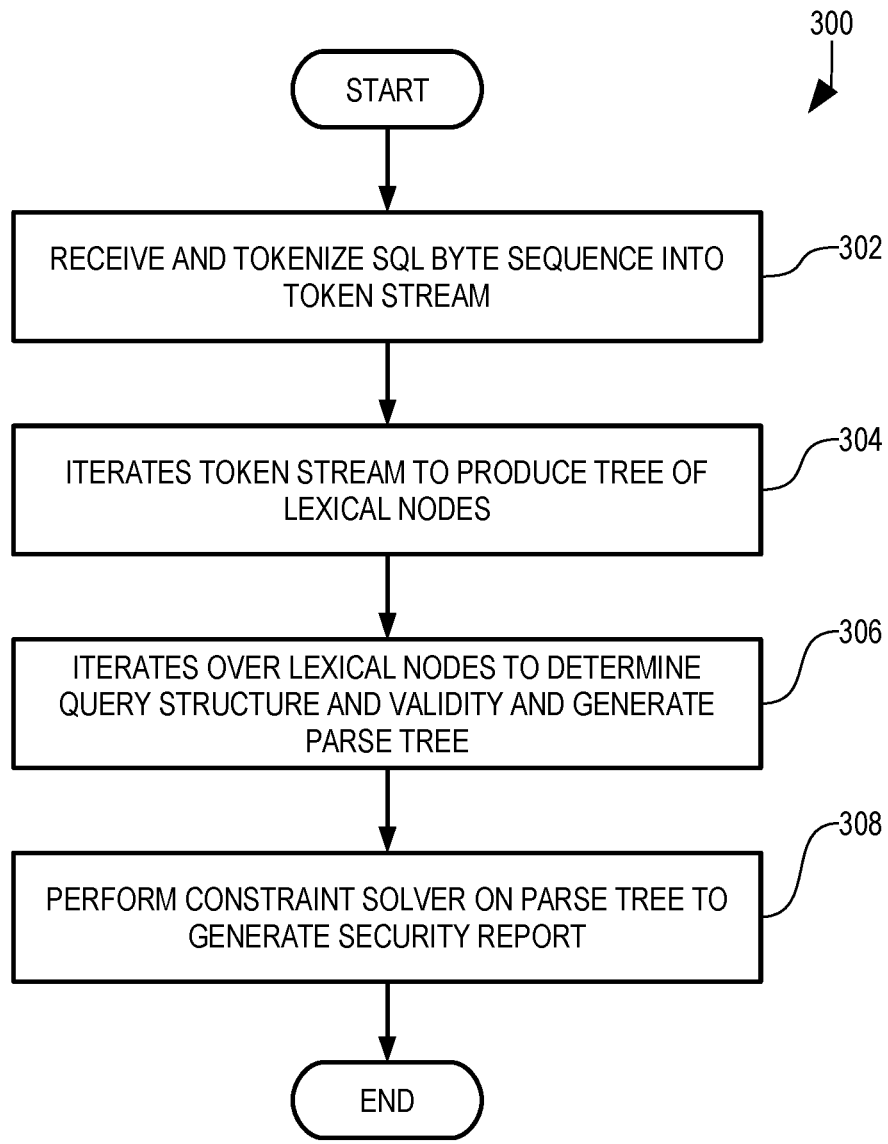
FIGS. 3 and 4 are example flow charts for the process of SQL query constraint solving, in accordance with some embodiments.

FIG. 3 provides an example flowchart, shown generally at 300, for the process of query constraint solving. As previously discussed, the first three steps prepare the SQL query for constraint analysis. These include receiving the SQL string and tokenizing it into a token stream (at 302), iterating over the token stream to generate lexical nodes (at 304), and parsing the lexical nodes to determine query structure and validity (at 306). These initial steps result in a parse tree which may be analyzed in the following step.

The parse tree is utilized for constraint solving (at 308). Constraint solving results in a security risk assessment, in some embodiments, where aspects of the query are simply reported out for action by the recipient. In other embodiments, the constraint solver may take additional risk mitigation steps, as previously mentioned. These additional steps may include designating likelihood of the SQL query including an injection attack, or even taking steps to minimize intrusion by detected SQL injection attempts (e.g., blocking access, altering SQL query to remove offending portions, etc.).

Figure 4:
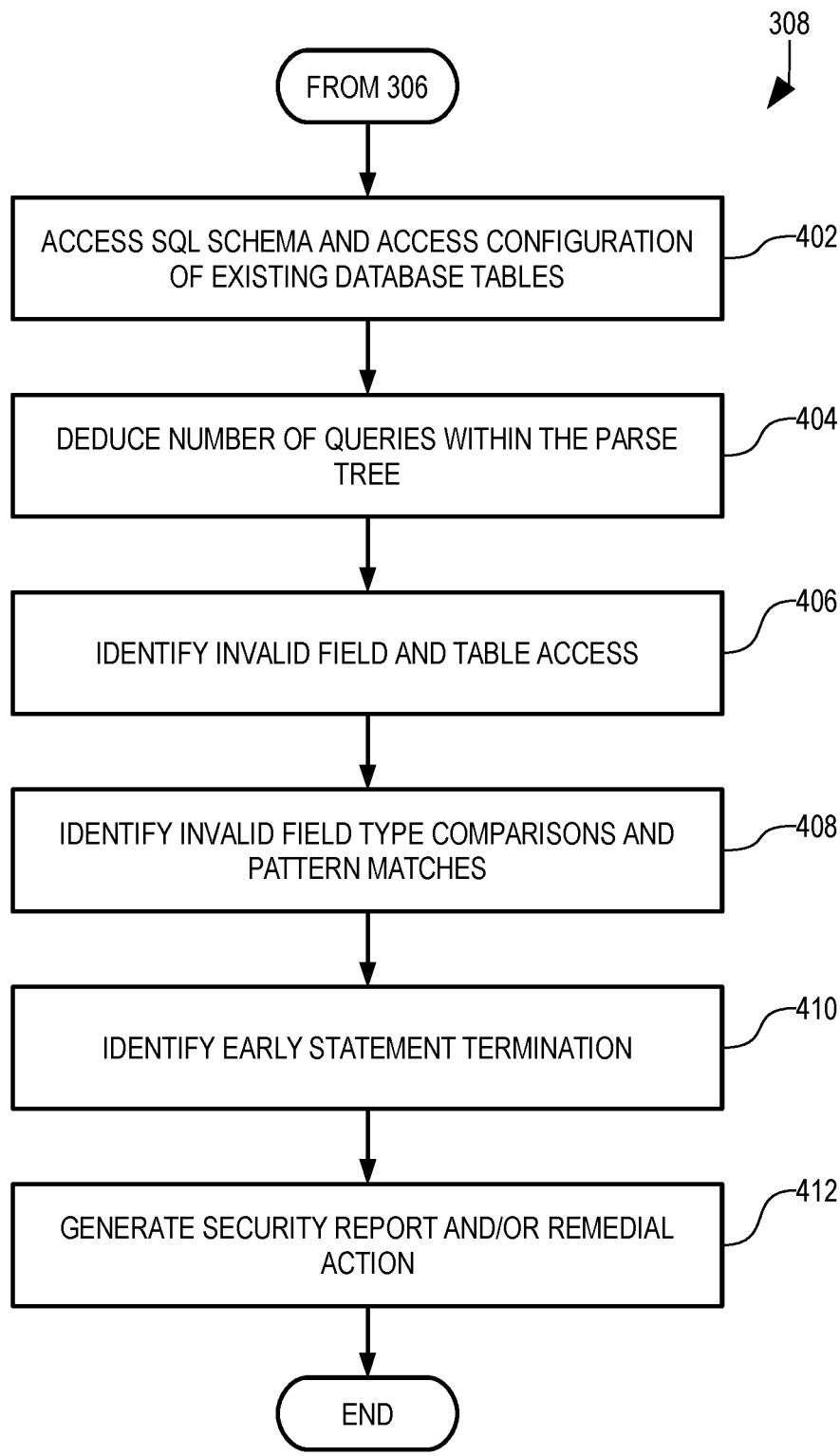

FIG. 4 provides a more detailed process of the constraint solver. This process starts by accessing (at 402) the SQL schema and access configuration, as described previously. The process then proceeds to compare the parse tree to these constraints. This enables the system to identify number of queries within the parse tree (at 404). This may include identifying query separators (such as semicolons) or subqueries (such as table joins and nested selections).

Next, invalid field and table access attempts are identified (at 406). This analysis is performed by matching the parse tree field/table identifiers against the access configurations and database schema. If the parse tree is attempting to access a field that does not exist, or to which there is restricted access, the query may be flagged as including an invalid access.

Likewise, invalid field type comparisons and pattern matches are identified (at 408). This identification may utilize a string comparison for an integer field, or fields, that should not be compared based on the access configuration. If the SQL query is requesting such a comparison, then it is flagged for an invalid field type comparison.

Lastly, early termination statements are identified (at 410). These early termination statements may take the form of an SQL comment used to break up commands, functions and/or identifiers, for example.

The output of the SQL constraint solving process is a tree that includes specific information about constraint violations, as identified above. This tree may be output in its raw form, or as a summary report as metadata to the SQL query (at 412). Alternatively, as discussed previously, remedial measures may be employed to reduce risk of an injection attack.

Figure 5A:
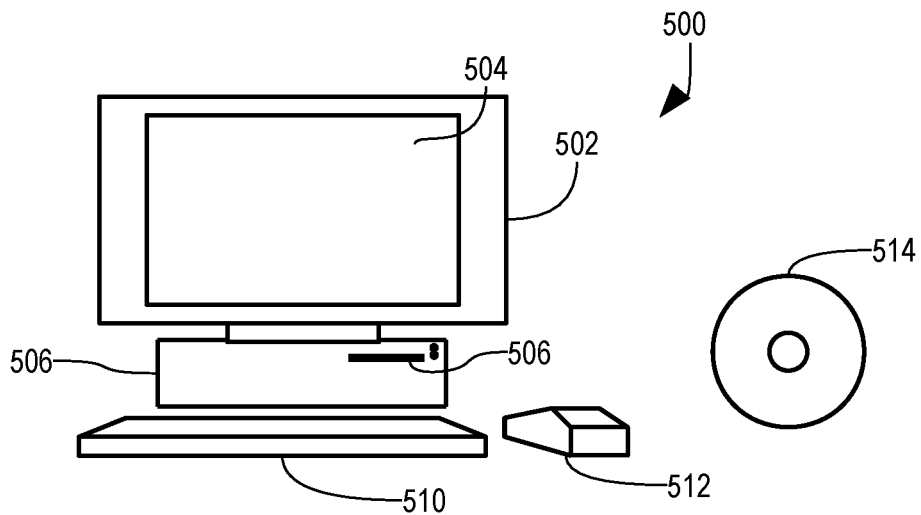
FIGS. 5A and 5B are example illustrations for computer systems configured capable of SQL query constraint solving, in accordance with some embodiments.
Figure 5B:
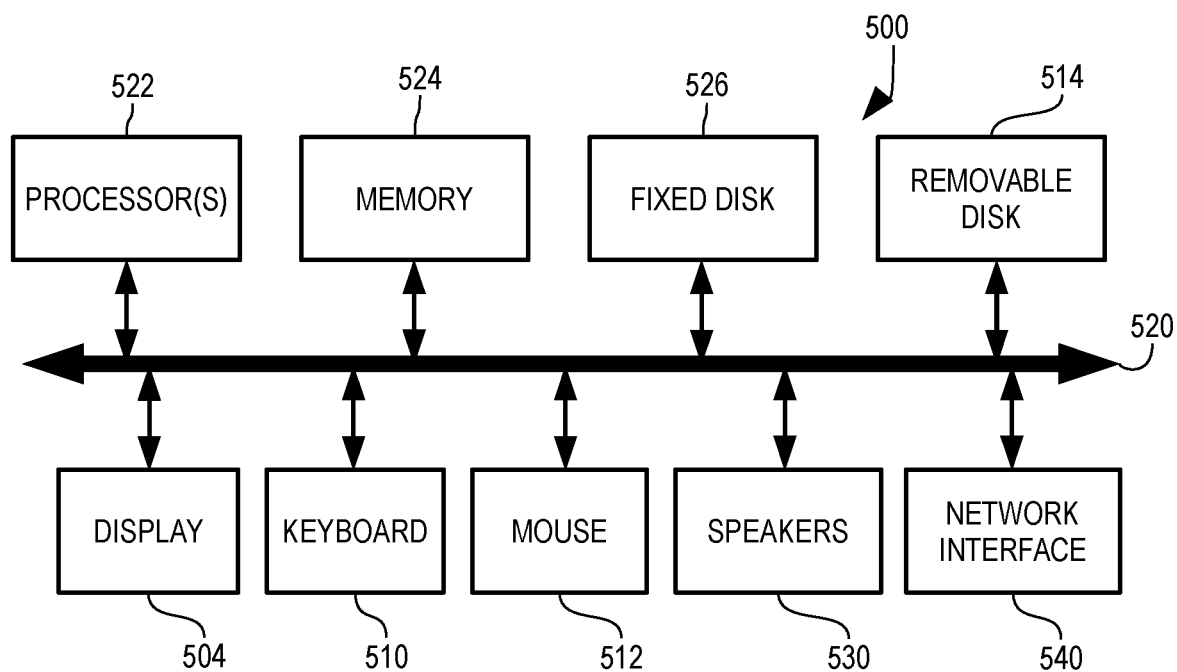

Computers today can take any of a number of physical forms, ranging from a printed circuit board, an integrated circuit, and a small handheld device up to a huge super computer. However, most computers in use today are of the general architecture of Computer System 500 (FIGS. 5A-B).

Computer system 500 includes one or more processors 522 ((5B) couple through an interconnect 520 to a number of storage devices, including in this illustrative example, memory 524, fixed disk 526, and removable disk 514. Collectively, these storage devices can include any type of computer-readable medium, including volatile storage devices such as RAM, ROM, any variation of PROM, for example, and persistent storage devices such as magnetic, optical, and solid-state disks for example. Fixed disk 526 and removable disk 514 are examples of such persistent storage devices. In this illustrative embodiment, interconnect 520 is one or more busses.

Processors 522 retrieve instructions and/or data from storage devices such as devices 524, 526, and 514 and executes those instructions in the context of the data.

Computer system 500 also includes a network interface 540 and includes network access circuitry by which computer system 500 can send and receive data, including computer instructions, through a computer network. In this illustrative embodiment, computer system 500 is a server computer system and therefore does not include user input and output devices. However, for completeness, such devices are shown as components of computer system 500.

Input devices generate signals in response to physical manipulation by a human user. Data representing those user-generated signals is received by processors 522 through interconnect 520. Examples of such input devices include a keyboard 510 and a mouse 512.

Output devices produce representations of data in a way that the data is perceptible by a human user. For example, processors 522 can cause a display 504 to present text and/or graphical images for visual perception by a human user. In addition, processors 522 can cause speakers 530 to produce sounds for audial perception by a human user.

Other examples of input/output devices include video displays, track balls, mice, keyboards, microphones, touch-sensitive displays, transducer card readers, magnetic or paper tape readers, tablets, styluses, voice or handwriting recognizers, biometrics readers, motion sensors, brain wave readers, or other computers.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

In sum, the present invention provides systems and methods for analyzing SQL queries for constraint violations, which may indicate injection attacks. Such systems and methods enable the identification and possibly prevention, of such attacks. This increases database security where employed.

A tautology-based attack is a type of SQL injection in which code is injected into in the SQL statement (SQL statement and SQL query are used synonymously hereinafter), causing the condition in the query to always evaluate to be true. Once the condition is satisfied due to the presence of a tautology, the query may execute to carry out the attack (such as, for example, extracting all columns or rows of a given database). Detecting tautology is a high priority in database attack prevention.

An example of a tautology-based attack is the injection of SQL code that compares two static values to generate an always-true condition for the "where" clause of the SQL statement. In other words, a tautology will cause the condition for accessing or exfiltrating the data to evaluate to be always true and thus allows the data to always be accessed or exfiltrated when the SQL statement executes. For example, the statement "Select * from users where 1=1" will always cause the condition, that is to say the comparison (1=1), to always evaluate to be true. Thus, this SQL statement will always cause all columns to be extracted from the database table "users."

Although tautology-based attacks are known, effective methods for detecting tautologies in SQL statements have been lacking. For example, pattern recognition has been attempted whereby the SQL statement is parsed in order to ascertain whether it contains a pattern of characters that represents a tautology. The problem with this approach is that by simply parsing and performing pattern recognition on the characters in the SQL statement without really understanding how the database engine would interpret the SQL statement, it's easy to generate a false positive. Another problem exists with respect to the difficulty of writing code to capture all possible instances of tautologies and to continuously update the code to ensure that new tautologies are detected.

White list is another approach to detecting tautology. The algorithm is trained to recognize queries that are legitimate, thereby forming a baseline "white list" of legitimate queries. After training, any query that does not appear in the white list will be flagged. White list training, however, is time consuming and also prone to producing false positives if the training is inadequate or if the query structure changes.

Parameterized query is an approach that attempts to rigidly define what the query must have and cannot have in its various fields. Once the parameterized query model is created, all applications must be written to conform to that parameterized model. Although parameterizing queries is a valid approach to preventing the injection of tautologies into SQL statements, it is expensive and time consuming to implement since existing legacy applications must be rewritten to conform to the parameterized query model.

Embodiments of the invention relate to methods and apparatus for detecting tautologies in SQL queries. As discussed earlier, the SQL query may be converted to a parse tree. The components of a parse tree are text strings, mathematical operators, parentheses, and other tokens that can be used to form valid expressions. These components are the building blocks for SQL requests, and they form the nodes and leaves of the parse tree. The generation of parse trees from SQL statements is known and will not be repeated here.

Taking the parse tree as an input, embodiments of the invention evaluate the parse tree for items that may be involved with and/or contribute to tautologies (defined as evaluating to be always true regardless of the database state) and/or contradictions (defined as evaluating to always be false regardless of the database state) and/or inefficient SQL coding. In this disclosure the term "evaluation flaw" covers tautologies, contradictions, and inefficient SQL coding, among others.

In one or more embodiments, there are provided methods for walking or evaluating step-wise through the parse tree to evaluate for types. If the query's condition hinges on dynamic (defined herein as being dependent on the data in the database) comparisons without any static (defined herein as being literal values or certain constant operations that are independent of the database content) comparison, no tautologies are deemed to exist in the SQL query. On the other hand, if the query's condition hinges on a static comparison, the SQL query is considered to be at risk of being infected with a tautology, or a contradiction or at least inefficiently formed. Alternatively or additionally, if the query's condition always evaluates to be a value or a type that is independent of the content of the database, always evaluates to be true or always evaluates to result in a static type, the SQL query is considered to be at risk of being infected with a tautology, or a contradiction or at least inefficiently formed. In any of these cases, attention should be paid to the SQL query In other embodiments, if there are static comparisons, these static comparisons can be evaluated to obtain the result. The resulting value would definitively indicate whether a tautology or a contradiction exists in the SQL query.

By performed complex, tiered evaluations, it is possible to not only detect strict tautologies/contradictions but to also identify suspicious behavior as well as inefficiencies in a query structure. For example, if a static comparison is made every time, it is possible to optimize the query by rewriting the query to avoid performing the static comparison repeatedly.

FIG. 6 shows, in accordance with an embodiment of the invention, a flow diagram for evaluating expression types via SQL parse tree reversal. Generally speaking, a depth-first (also known as bottom-up) methodology is employed to walk (i.e., evaluate step-wise) the parse tree (602) and find (604) all select lists (606), where clauses (608), expressions (610), and unary expression objects (612).

Generally speaking, select list is a SQL query component that determines what data will be returned by the query. Where clause includes a comparison predicate and is used to further restrict data to be returned by the query. Expression is the comparison predicate that is capable of evaluating to true or false. Generally speaking, the expression can be any mathematical operation, including a comparison. A sub-query can also be used in an expression. Unary expression objects are objects that cannot be further divided. Examples of unary expression objects include variables in the data base, a single column, literal values which may be expressed as boolean, decimal, hexadecimal, or as strings for example. These components are well known and will not be elaborated further herein. In the parse tree, these components are represented by nodes (606, 608, 610, and 612).

At the branch that contains select list (606), the method statically evaluates contents of the select list indicated and passes the express type of the contents up to the parent node for further evaluation, if needed (614). At the branch that contains unary expression objects (612), the method drills down to the unary expression and evaluates its type. The type evaluated will be passed up to the parent node in the parse tree for further evaluation (620). At the branch that contains expression (610), the method evaluates the expression based on component types passed up from its children (618). At the branch that contains the where clause (608), the method records the evaluated expression type (616), which evaluated expression type is obtained from evaluation of the expression (610). The process continues until the root node or a termination clause is encountered. The result of the evaluation is an expression type that represents the operation performed by the where clause of the SQL statement.

If the expression type is a dynamic comparison, no tautology is deemed to exist with respect to that where clause in the SQL query. As mentioned earlier, a dynamic comparison, in the context of the present invention, has its result dependent on the data in the database.

If the expression type is a static comparison, tautologies (defined as evaluating to be always true regardless of the database state), or contradictions (defined as evaluating to always be false regardless of the database state), or inefficiencies are deemed to possibly exist in the SQL query. In this case, the SQL query is flagged for investigation. Additionally or alternatively, the SQL query execution is halted to protect against possible or actual unauthorized exfiltration of data.

Figure 7A:
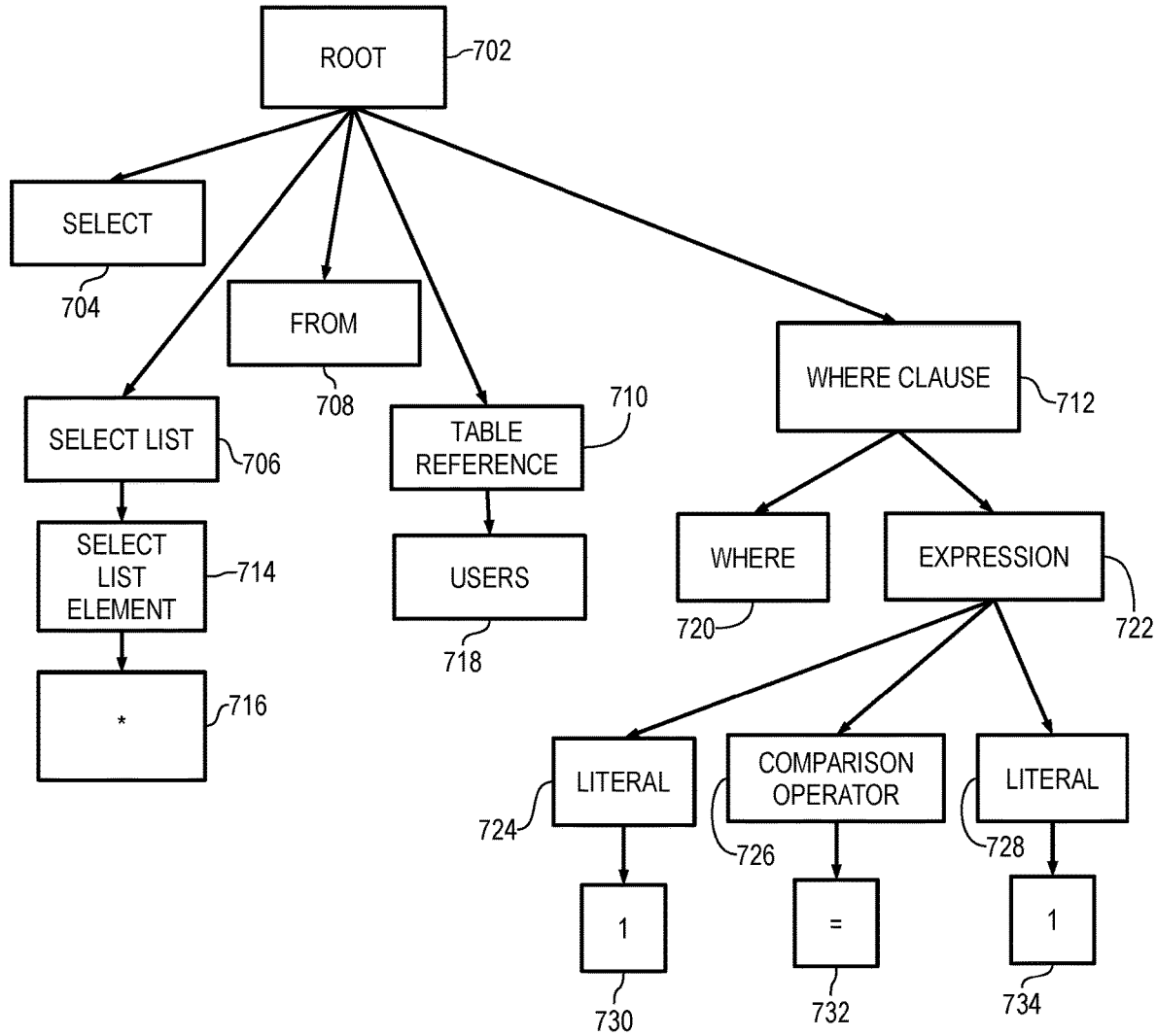
FIG. 7A is an example showing, in accordance with an embodiment of the present invention, how the method steps of FIG. 6 execute against a parse tree generated from an example SQL query.

FIG. 7A is an example showing how the method steps of FIG. 6 execute against a parse tree generated from the SQL query "SELECT * from users where 1=1". The parse tree of this SQL statement is shown as parse tree 700. Block 702 represents the root node. All the bottom leaves such as 704, 716, 708, 718, 720, 730, 732, and 734 form the original SQL query.

Figure 7B:
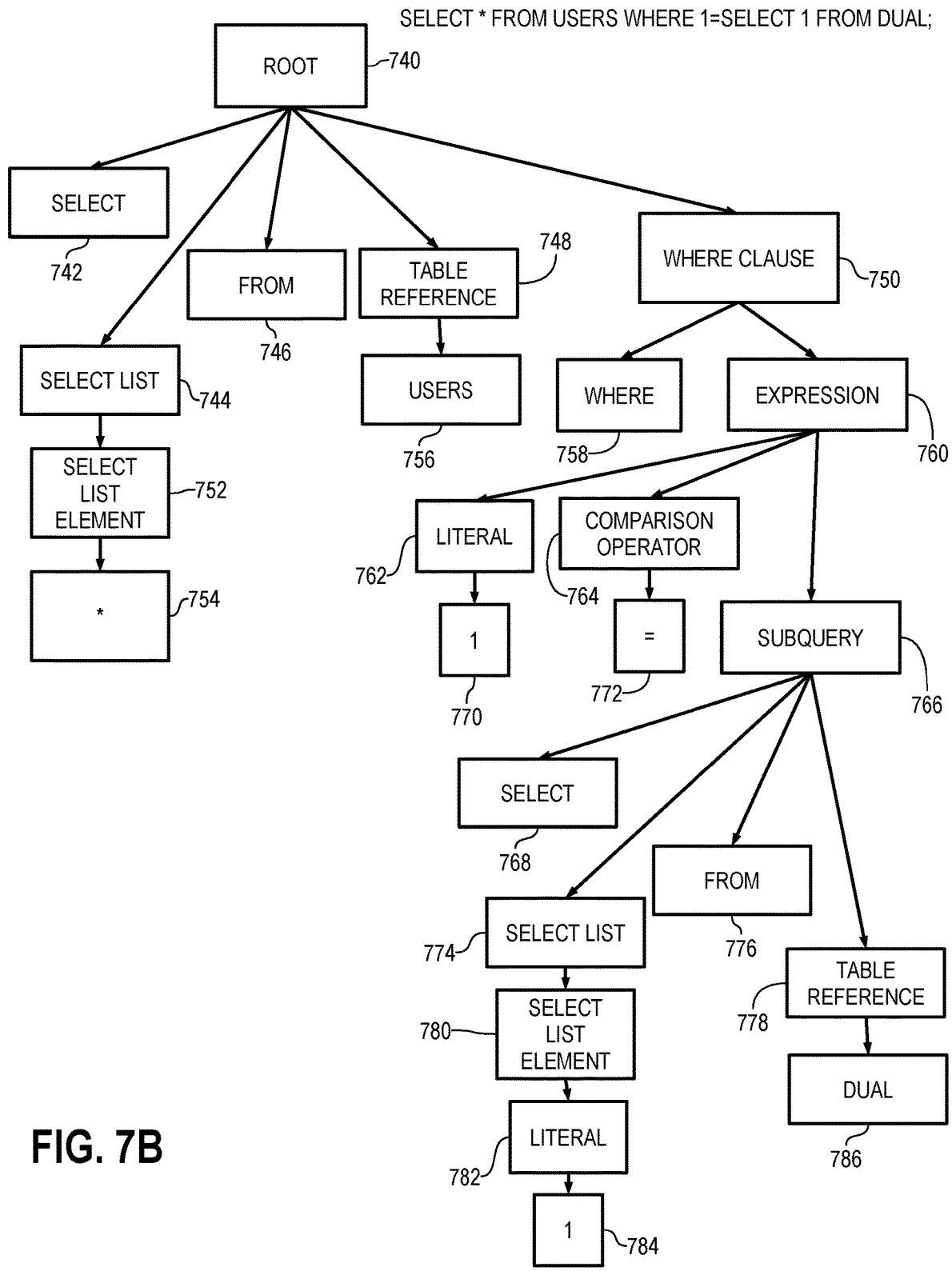
FIG. 7B shows, in accordance with an embodiment of the present invention, how the method steps of FIG. 6 execute against a parse tree generated from another example SQL query.

In block 704 the component SELECT is shown. Since this is neither a SELECT LIST nor a UNARY EXPRESSION object, this is ignored. Block 706 represents the SELECT LIST. The SELECT LIST ELEMENT (714) is shown to be "*" (716). The static type of this value (in this case, dynamic) is saved in case of a further evaluation against this type needs to be made. This may be the case if this SELECT LIST happens to be part of a SUB-QUERY, as would be the case in the example of FIG. 7B. FIG. 7B will be discussed later here in.

Block 708 represents the component from and is neither a SELECT LIST nor a UNARY EXPRESSION object so it is ignored. Table reference (710) refers to table "users" (718).

Under EXPRESSION 722, there are two LITERALS (724 and 728). The first LITERAL value (730) is "1". The second LITERAL value (734) is "1". The comparison operator (726) is the equal comparison operator (732).

Evaluation of LITERAL "1" results in a static type for each of blocks 730 and 732 since this value does not depend on the value of the database. These results are passed upstream to EXPRESSION block 722. EXPRESSION 722 therefore is a comparison between two static types, and this comparison is passed up to its parent node (WHERE CLAUSE 712). In this example, it turns out that the value of SELECT LIST "*" (716) is not needed since SELECT LIST 706 is not a child of any SUB-QUERY. The result of the evaluation of WHERE CLAUSE 712 (a static comparison) is passed up to root node 702. Since the result of the evaluation of the SQL query is a static comparison, it is deemed that a tautology, a contradiction, or at least a deficiency exists in the SQL query.

FIG. 7B shows a more complicated example wherein a SUB-QUERY (766) is present. The SQL query to be evaluated is "SELECT * from users where 1=SELECT 1 from dual" whereby "dual" is a specific database table.

Block 740 is the root node. Select block 742 is the SELECT component of the SQL statement. Select list (744) has SELECT LIST ELEMENT (752) and value "*" (754). As before, the type of the value "*" of block 754 is saved since it is not known at this point whether SELECT LIST 744 is a part of a SUB-QUERY. This is because the traversal method is bottom-up (depth first) and the method only has knowledge of the current node/branch under evaluation.

Block 746 "FROM" is a component of the SQL statement. Since it is neither a SELECT LIST nor a UNARY EXPRESSION type, it is ignored. Block 748 is the table reference, which includes the table identifier "users" (756).

WHERE CLAUSE 750 is a component of the SQL query and contains the component WHERE 758 and EXPRESSION 760. EXPRESSION 760 implements the expression "1=SELECT 1 from dual" and thus includes LITERAL 762 that has the value "1" (770). This value "1" (770) is evaluated for type, which turns out to be a static type, and the static type is saved.

Comparison operator 764 includes the comparator equal (772).

SUB-QUERY 766 represents the portion of the original SQL statement that is "select 1 from dual". Thus, there is shown a SELECT block 768 and a SELECT LIST 774, which contains SELECT LIST ELEMENT 780. In this case, SELECT LIST ELEMENT 780 is a LITERAL (782) with a value of "1" (784). Since this value "1" (784) is a UNARY EXPRESSION, it is evaluated for type, which happens to be a static type. This static type is passed up to its parent node (782/780/774/766) and makes its way up to EXPRESSION node 760.

FROM (block 776) is a component of the original SQL query. Table reference (778) includes the value "dual" (786). Since this is not a SELECT LIST or a UNARY EXPRESSION type, there is no need to save this type.

At EXPRESSION block 760, the entire expression "1=1" (770/772/784) is evaluated, and it is a static comparison. This static comparison is passed upstream to parent node 750 and is recorded in WHERE CLAUSE block 750. In this case, the result is a static comparison and thus there exists a possibility that a tautology, a contradiction, or inefficiency may exist with this SQL query.

Note that the type of the value "*" (754) is originally saved. However, this SELECT LIST 744 is not a part of any SUB-QUERY. Thus it turns out that the type of the value "*" does not need to be saved. However, since this is a bottom-up depth-first traversal algorithm, it is not possible to know in advance at the moment the value "*" (754) is evaluated for type whether SELECT 744 is a part of a SUB-QUERY. Since it is not possible to know, this type evaluation of the value (744) of SELECT LIST ELEMENT 752 is saved anyway.

Also note that the type evaluation for the LITERAL "1" (784/782) is also an element of SELECT LIST (774/780). Although it is not possible to know in advance at the moment the value "1" (784) is evaluated for type whether this SELECT LIST ELEMENT 780 is part of a SUB-QUERY, the saving of this type evaluation turns out to be useful since SELECT LIST 774 is part of SUB-QUERY 766. For this reason, the type evaluation for a SELECT LIST ELEMENT is saved just in case it turns out that the associated SELECT LIST ELEMENT is part of a SUB-QUERY.

The type evaluation result of WHERE CLAUSE 750 is passed up to root node 740. The evaluation result for this parse tree of FIG. 7B is another static comparison and thus, there exists a possibility that a tautology, a contradiction, or inefficiency may exist with this SQL query.

Note that because the structure of the SQL language and a parse tree structure are utilized, it is possible to evaluate and know what type SUB-QUERY 766 would evaluate to. In this case, the value (784) is evaluated to be "1" within this sub-query, which type is a static type. If the query structure was not available, and the traversal method of embodiments of the invention is not employed, it would not be possible to understand that the value of SUB-QUERY 766 is a "1" and the type of this SUB-QUERY 766 is static in order to allow the method to conclude that the entire SQL query is a static comparison. In other words, the SQL query is evaluated in the same way that the database would evaluate the SQL query for execution.

Figure 8A:
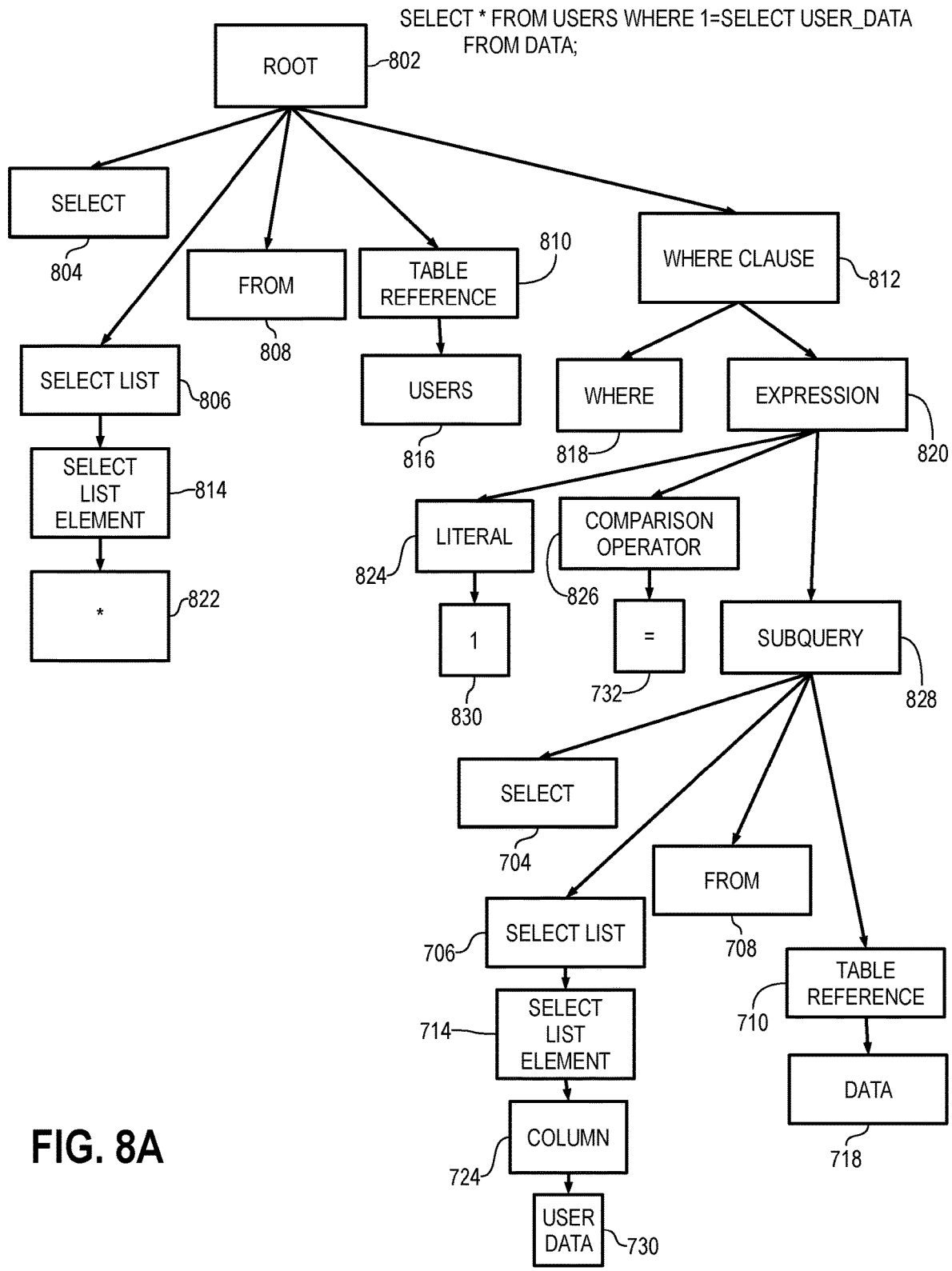
FIG. 8A shows, in accordance with an embodiment of the present invention, how the method steps of FIG. 6 execute against a parse tree generated from an example SQL query that involves a dynamic type comparison.

FIG. 8A is an example of a dynamic type comparison. The parse tree 800 of FIG. 8A implements the SQL query "SELECT * from users where 1=select user_data from data".

Block 802 is the root node. Block 804 is the SELECT component of the SQL statement. Block 806 is the SELECT LIST element that includes SELECT LIST ELEMENT 814, which in turn has the value "*" 822. Since this is part of SELECT LIST 806, the value "*" (822) is evaluated for type, which happens to be a dynamic type. This dynamic type is saved the since it is not known at this point in time whether SELECT LIST 806 is part of a SUB-QUERY.

Block 808 is component from of the SQL statement.

Block 810 is a table reference that has the value "users" 816. WHERE CLAUSE 812 consists of component WHERE 818 and EXPRESSION 820. This EXPRESSION 820 implements the phrase "select user_data from data".

There is shown a LITERAL block 824 with a value "1" (830), which evaluates to be a static type. Comparison operator at 826 has the equal operator (832).

Sub query 828 includes SELECT block 834, SELECT LIST 836 which has SELECT LIST ELEMENT 842, column 844, and the value "user_data" 846. Since user data 846 is part of SELECT LIST 836, it is evaluated for type, and it is a dynamic type. This dynamic type is passed up to parent (828/820).

Block 838 implements the expression FROM, which is part of the original SQL query. Table reference 840 includes the value database identifier "data" 848. The dynamic type evaluated from SELECT LIST 836/828 and from LITERAL 830/824 are passed to EXPRESSION 820, where this expression "1=SELECT user_data from data" is evaluated.

The evaluation returns the expression type to be a dynamic expression, which is recorded in WHERE CLAUSE 812. Again, the value and type of "*" 822 is not needed since SELECT LIST 806 is not part of a SUB-QUERY.

The evaluation results 812 is passed to root node 802. The evaluation of the SQL EXPRESSION of FIG. 8A turns out to be a dynamic type comparison, which is not indicative of a risk for tautology.

Figure 8B:
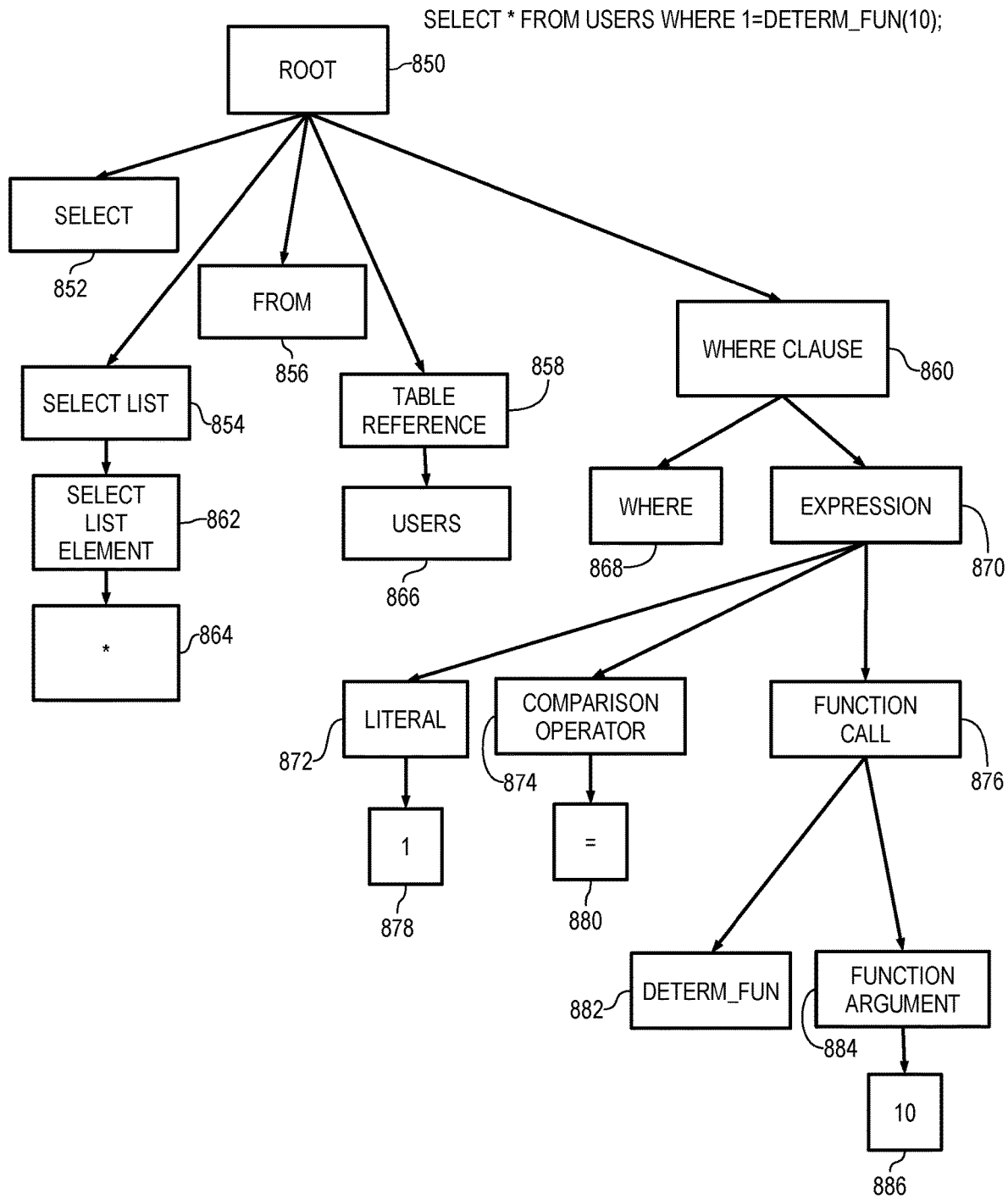
FIG. 8B shows, in accordance with an embodiment of the present invention, a more complicated example showing how the method steps of FIG. 6 execute against a parse tree generated from an example SQL query that involves a deterministic user defined function.

FIG. 8B is an example that involves a user defined function "determ_fun" that is deterministic. In FIG. 8B, the SQL query is "SELECT * from users where one=determ_fun (10)".

Root node 850 is shown in FIG. 8B. SELECT 852 implements the SELECT function of the original SQL statement.

Select list 854 includes SELECT LIST ELEMENT 862, which has the value "*" 864. Since we do not know at this time whether SELECT LIST 854 is a part of another SUB-QUERY, the type of "*" 864, which is dynamic, is stored.

Block 856 implements the component from out of the original SQL query.

Table reference 858 has the value "users" 866. WHERE CLAUSE 860 includes block 868 (WHERE) and EXPRESSION 870. EXPRESSION 870 implements the phrase "one=determ_fun (10)" of the original SQL statement. Thus, LITERAL 872 has the value "1" (878), which evaluates to be a static type. Comparison operator 874 includes comparator 880 "=".

The function call 876 includes the function identifier 882, which is determ_fun. Function argument 884 has the value of 10 (886). Since this is a deterministic function, and while it is not known what this function does, it is true that a deterministic function would return the same value for a given input every time. Accordingly, the type for determ_fun (10) would be static.

The static type would be passed up to EXPRESSION 870, where it is evaluated in a comparison against the static type out of LITERAL 872 and value "1" 878. This EXPRESSION in block 870 is evaluated to be a static comparison in WHERE CLAUSE 860. Again it turns out that the type for the value "*" stored in block 864 is not needed since SELECT LIST 854 is not part of a SUB-QUERY. The end result is that the static comparison is passed up to root node 850.

Since this is a static comparison, there exists a possibility that a tautology, a contradiction, or inefficiency exist with regard to the SQL statement of FIG. 8B.

Figure 9:
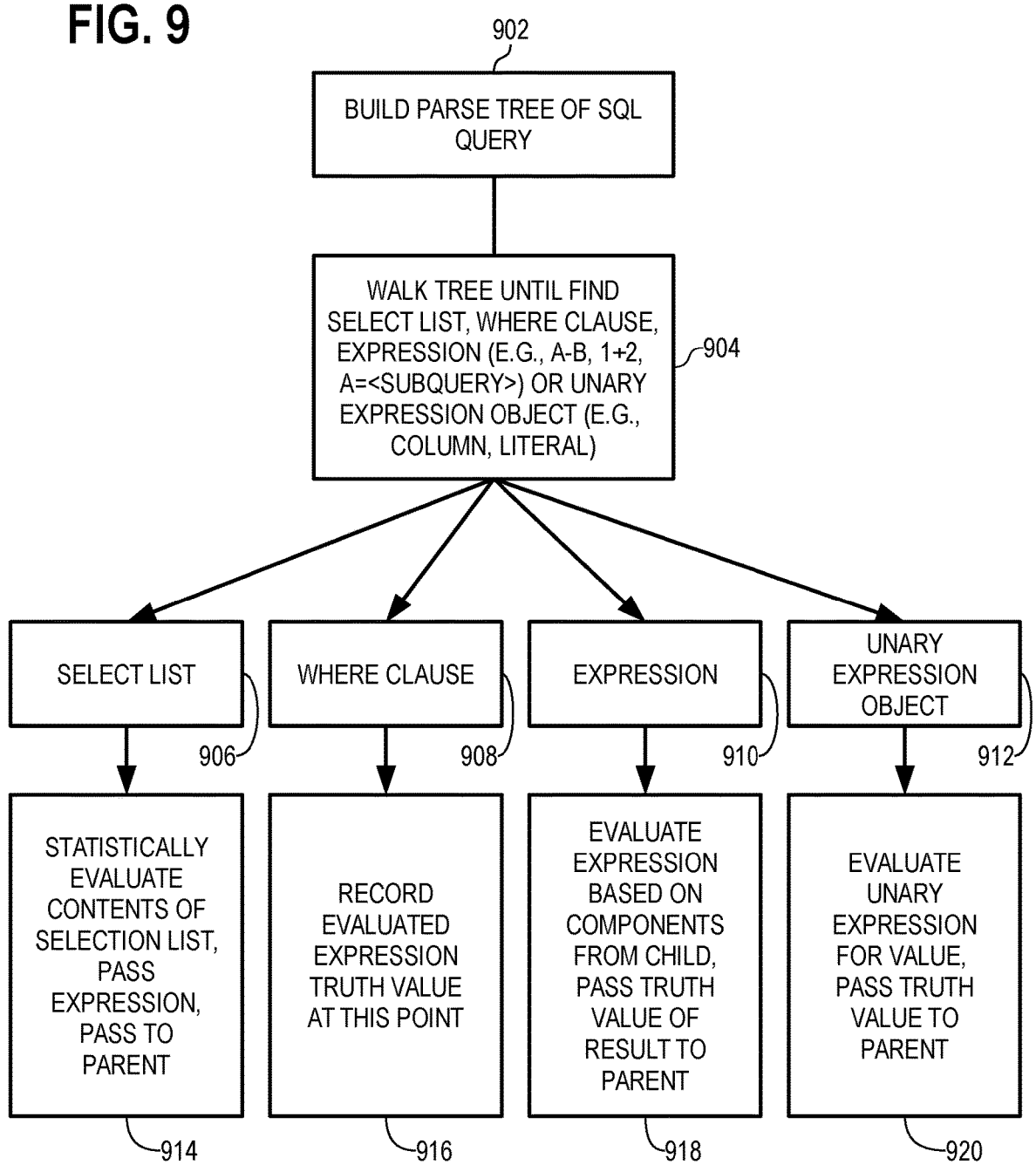
FIG. 9 shows, in accordance with an embodiment of the invention, a flow diagram for evaluating expression values via SQL parse tree reversal.

FIG. 9 shows, in accordance with an embodiment of the invention, a flow diagram for evaluating EXPRESSION values via SQL parse tree reversal. In contrast to FIG. 6 which evaluates for types, the steps of FIG. 9 evaluates for values. Evaluation for value is useful in situations where it is possible to statically evaluate an expression. This is the case where, for example, the expression involves known operation between static parts such as 1=1 or involves an annihilating operation between static and dynamic parts such as 0*x. The SQL parse tree can be evaluated in a bottom-up, depth-first fashion to determine whether the result at the where clause is a tautology (defined as evaluating to be always true regardless of the database state) or a contradiction (defined as evaluating to always be false regardless of the database state). In either case, the SQL query is flagged for investigation. Additionally or alternatively, the SQL query execution is halted to protect against possible or actual unauthorized exfiltration of data.

Generally speaking, a depth-first (also known as bottom-up) methodology is employed to walk (i.e., evaluate stepwise) the parse tree (902) and find (904) all SELECT LISTS (906), WHERE CLAUSES (908), EXPRESSIONS (910), and UNARY EXPRESSION objects (912).

At the branch that contains SELECT LIST (906), the method statically evaluates (914) contents of the SELECT LIST indicated and passes the value of the contents up to the parent node for further evaluation, if needed. At the branch that contains UNARY EXPRESSION objects (912), the method drills down (920) to the UNARY EXPRESSION and evaluates its value. The value evaluated will be passed up to the parent node in the parse tree for further evaluation. At the branch that contains EXPRESSION (910), the method evaluates (918) the EXPRESSION based on component values passed up from its children. At the branch that contains the WHERE CLAUSE (908), the method records (916) the evaluated EXPRESSION value, which evaluated EXPRESSION value is obtained from evaluation of the EXPRESSION (910). The process continues until the root node or a termination clause is encountered. The result of the evaluation is a value that represents the data returned by the WHERE CLAUSE of the SQL statement.

Figure 10A:
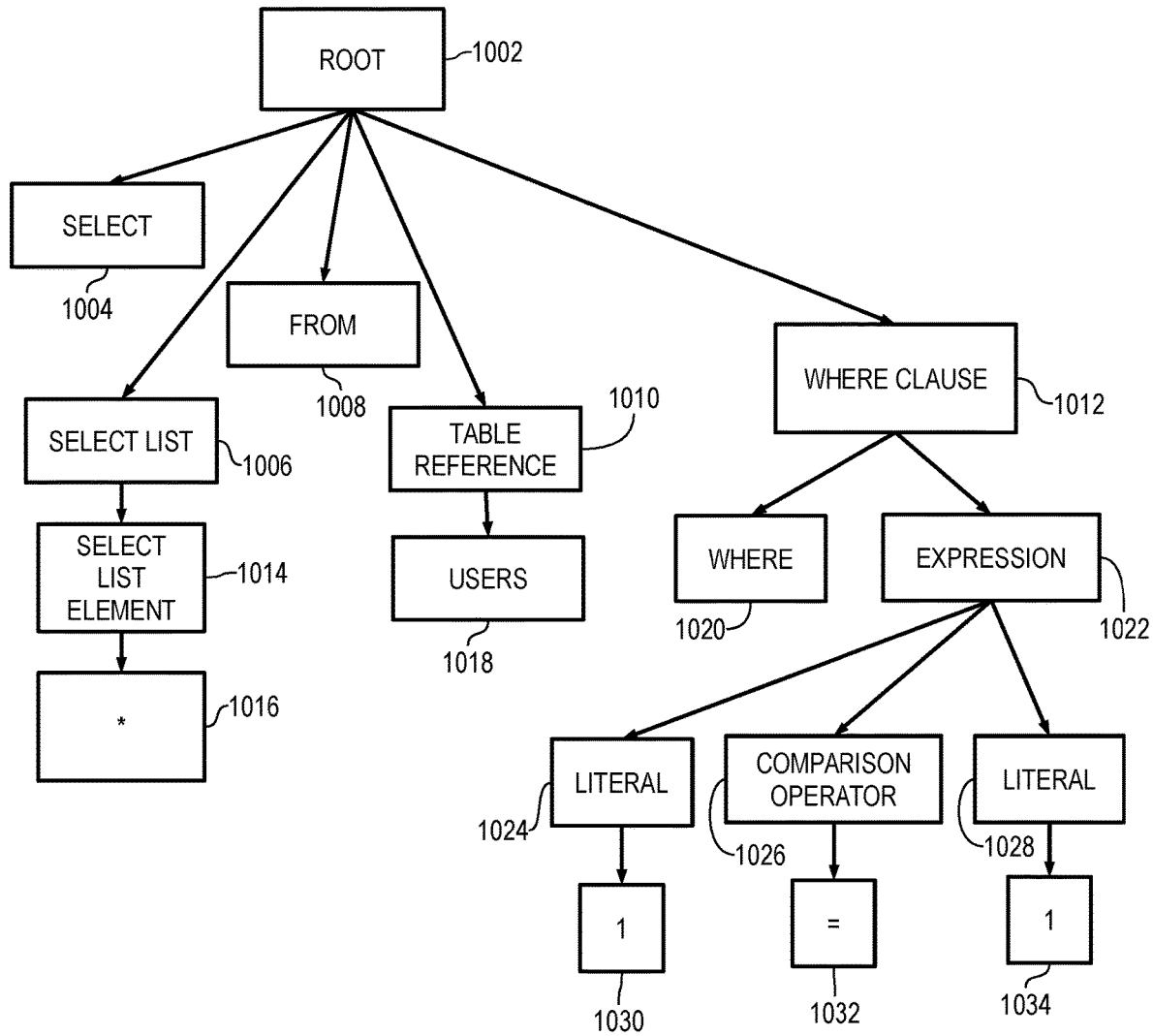
FIG. 10A shows, in accordance with an embodiment of the invention, how the method steps of FIG. 9 execute against a parse tree generated from an example SQL query.

FIG. 10A is an example showing how the method steps of FIG. 9 execute against a parse tree generated from the SQL query "select * from users where 1=1". The parse tree of this SQL statement is shown as parse tree 1000. Block 1002 represents the root node. All the bottom leaves such as 1004, 1016, 1008, 1018, 1020, 1030, 1032, and 1034 form the original SQL query.

Figure 10B:
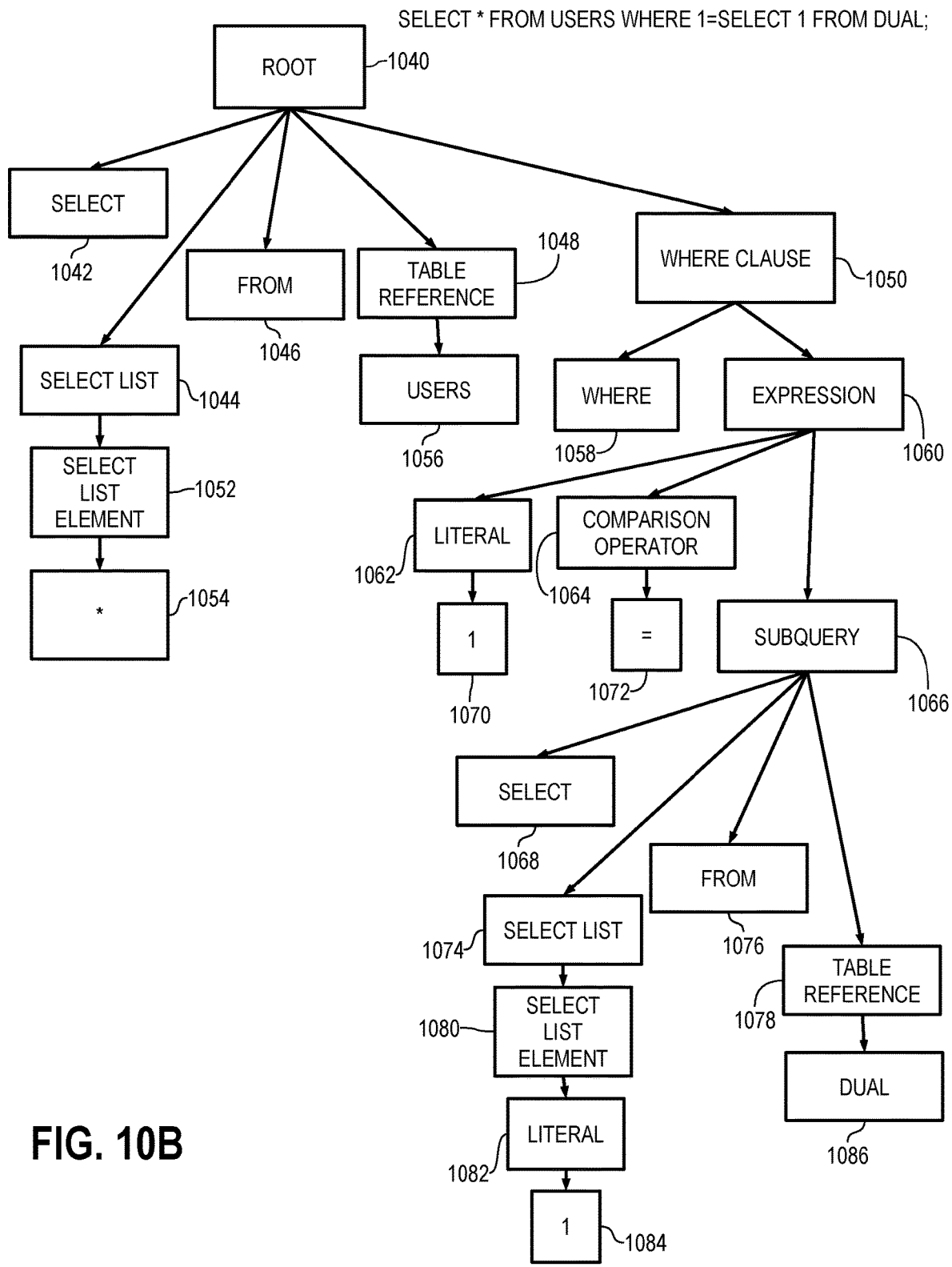
FIG. 10B shows, in accordance with an embodiment of the present invention, how the method steps of FIG. 9 execute against a parse tree generated from an example SQL query wherein a sub-query is present.

In block 1004 the component select is shown. Since this is neither a SELECT LIST nor a UNARY EXPRESSION object, this is ignored. Block 1006 represents the SELECT LIST. The SELECT LIST element (1014) is shown to be "*" (1016). This value is saved in case of a further evaluation against this value needs to be made. This may be the case if this SELECT LIST happens to be part of a sub-query, as would be the case in the example of FIG. 10B. FIG. 10B will be discussed later here in.

Block 1008 represents the component FROM and is neither a SELECT LIST nor a UNARY EXPRESSION object so it is ignored. Table reference (1010) refers to table "users" (1018).

Under EXPRESSION 1022, there are two LITERALS (1024 and 1028). The first LITERAL value (1030) is "1". The second LITERAL value (1034) is "1". The comparison operator (1026) is the equal comparison operator (1032).

Expression 1022 therefore is a comparison between two values, and this comparison result (true since 1=1) is passed up to its parent node (WHERE CLAUSE 1012). In this example, it turns out that the value of SELECT LIST "*" (1016) is not needed since SELECT LIST 1006 is not a child of any sub-query. The result of the evaluation of WHERE CLAUSE 1012 (true) is passed up to root node 1002. Since the result of the evaluation of the SQL query is always true, it is deemed that a tautology exists in the SQL query.

FIG. 10B shows a more complicated example wherein a sub-query (1066) is present. The SQL query to be evaluated is "select * from users where 1=select 1 from dual" whereby "dual" is a specific database table.

Block 1040 is the root node. SELECT block 1042 is the select component of the SQL statement. SELECT list (1044) has SELECT LIST element (1052) and value "*" (1054). As before, the value "*" of block 1054 is saved since it is not known at this point whether SELECT LIST 1044 is a part of a sub-query. This is because the traversal method is bottom-up (depth first) and the method only has knowledge of the current node/branch under evaluation.

Block 1046 "FROM" is a component of the SQL statement. Since it is neither a SELECT LIST nor a UNARY EXPRESSION, it is ignored. Block 1048 is the table reference, which includes the table identifier "users" (1056).

WHERE CLAUSE 1050 is a component of the SQL query and contains the component where 1058 and EXPRESSION 1060. Expression 1060 implements the expression "1=select 1 from dual" and thus includes LITERAL 1062 that has the value "1" (1070). This value "1" (1070) is saved.

Comparison operator 1064 includes the comparator equal (1072).

Sub query 1066 represents the portion of the original SQL statement that is "select 1 from dual". Thus, there is shown a select block 1068 and a SELECT LIST 1074, which contains SELECT LIST element 1080. In this case, SELECT LIST element 1080 is a LITERAL (1082) with a value of "1" (1084). This value is passed up to its parent node (1082/1080/10104/1066) and makes its way up to EXPRESSION node 1060.

From (block 1076) is a component of the original SQL query. Table reference (1078) includes the value "dual" (1086). Since this is not a SELECT LIST or a UNARY EXPRESSION, there is no need to save this value.

At EXPRESSION block 1060, the entire expression "1=1" (1070/1072/1084) is evaluated, and it is a static comparison with the result=true. This value is passed upstream to parent node 1050 and is recorded in WHERE CLAUSE block 1050. In this case, the result is an "always-true" value, and thus there exists a possibility that a tautology may exist with this SQL query. Note that if the result is "always false", it is deemed that a contradiction exists with this SQL query.

Note that because the structure of the SQL language and a parse tree structure are utilized, it is possible to evaluate and know what sub-query 1066 would evaluate to. In this case, the value (1084) is evaluated to be "1" with the sub-query. If the query structure was not available, and the traversal method of embodiments of the invention is not employed, it would not be possible to understand that the value of sub-query 1066 is a "1" in order to allow the method to conclude that the WHERE CLAUSE of the SQL statement evaluates to be always true. In other words, the SQL query is evaluated in the same way that the database would evaluate the SQL query for execution.

Figure 11:
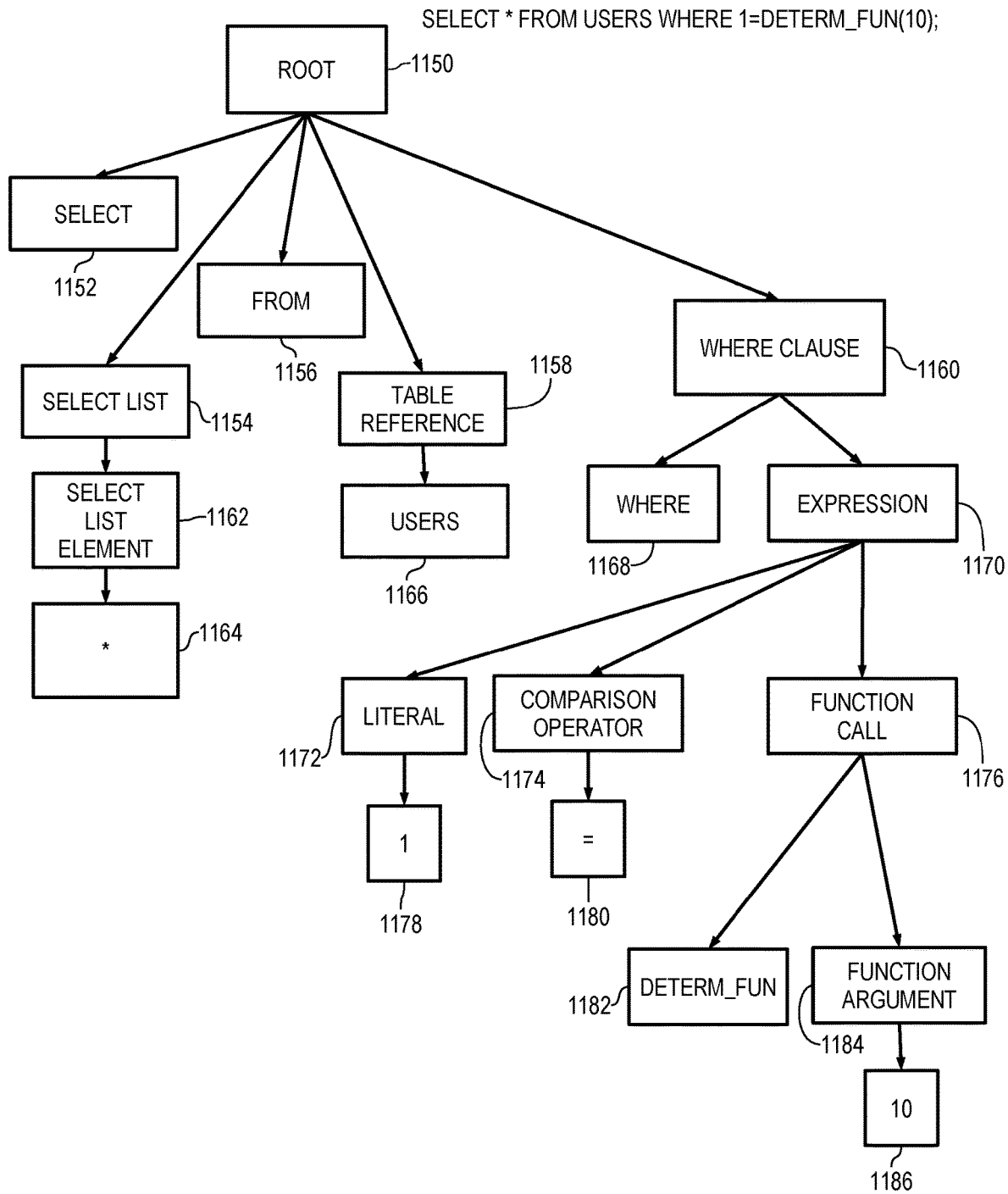
FIG. 11 shows, in accordance with an embodiment of the present invention, how the method steps of FIG. 9 execute against a parse tree generated from an example SQL query wherein a deterministic user defined function is present.

FIG. 11 is an example that involves a user defined function "determ_fun" that is deterministic. In FIG. 11, the SQL query is "select * from users where one=determ_fun (10)".

Root node 1150 is shown in FIG. 11. Select 1152 implements the SELECT function of the original SQL statement.

SELECT LIST 1154 includes SELECT LIST element 1162, which has the value "*" 1164. Since we do not know at this time whether SELECT LIST 1154 is a part of another sub-query, the value "*" 1164 is stored.

Block 1156 implements the component FROM out of the original SQL query.

Table reference 1176 has the value "users" 1166. WHERE CLAUSE 1160 includes block 1168 (WHERE) and EXPRESSION 1170. Expression 1170 implements the phrase "one=determ_fun (10)" of the original SQL statement. Thus, LITERAL 1172 has the value "1" (1178). Comparison operator 1174 includes comparator 1180 "=".

The function call 1176 includes the function identifier 118, which is determ_fun. Function argument 1184 has the value of 10 (1186). Since this is a deterministic function, and since it is not known what this function does, it is not possible to evaluate for its value.

FIG. 11 is thus an example where it is possible to evaluate for the type (see FIG. 8B) but not for the value. The ability to process for types is thus a powerful tool provided by embodiments of the invention. This fact also illustrates the utility and generality of the approach of evaluating for type to detect tautologies/contradictions/inefficiencies.

As described above, a number of storage devices, including memory 524 (FIGS. 5A-B) and fixed disk 526, are coupled to processors 522 through interconnect 520. Those storage devices are represented collectively as storage 524/526 in FIG. 12. Storage 524/526 stores data and computer instructions that cause computer system 500 to perform the security processing described herein. In particular, storage 524/526 includes SQL request security engine logic 1202 (FIG. 12) and security engine configuration data 1204 and security engine logs 1206.

SQL request security logic 1202 includes one or more computer processes executing in processors 522 from storage 524/526 and causes computer system 500 to behave in the manner described herein. As used herein, "logic" refers to (i) computer instructions and data and/or (ii) electronic circuitry that cause a computer to exhibit a particular behavior.

Security engine configuration data 1204 includes data that, at least in part, define the behavior of SQL request security logic 1202. In particular, specific data within security engine configuration data 1204 can be used to customize a particular instance of SQL request security logic 1202 for a particular user's needs. Security engine logs 1206 include data generated by SQL request security logic 1202 during execution so as to keep a more persistent record of specific actions taken by SQL request security logic 1202. Security engine logs 1206 can be helpful in troubleshooting processing errors or answering questions by human users/clients as to what events might have transpired.

Figure 13:
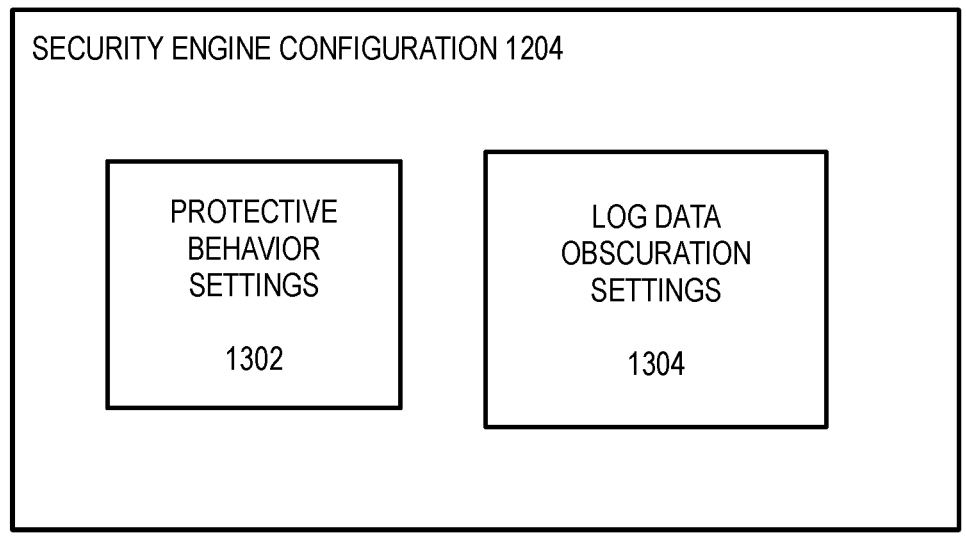
FIG. 13 is a block diagram showing security engine configuration data of FIG. 12 in greater detail.

Security engine configuration data 1204 is shown in greater detail in FIG. 13 and includes protective behavior settings 1302 and log data obscuration settings 1304. Protective behavior settings 1302 and log data obscuration settings 1304 control the behavior of SQL request security engine logic 1202 in a manner described herein. It should be appreciated that, while the manner in which behavior settings 1302 and log data obscuration settings 1304 control the behavior of SQL request security engine logic 1202 is in the context of protecting against SQL injection attacks, the same techniques can be used to improve protection from other injection attacks, such as cross-site scripting (XSS), for example.

Figure 14:
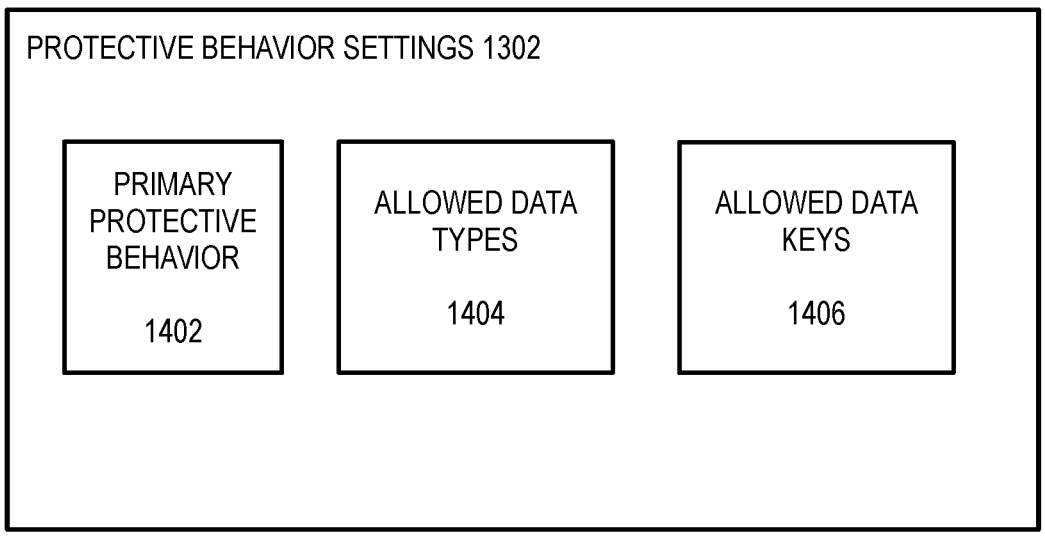
FIG. 14 is a block diagram showing protective behavior settings of FIG. 13 in greater detail.
Figure 20:
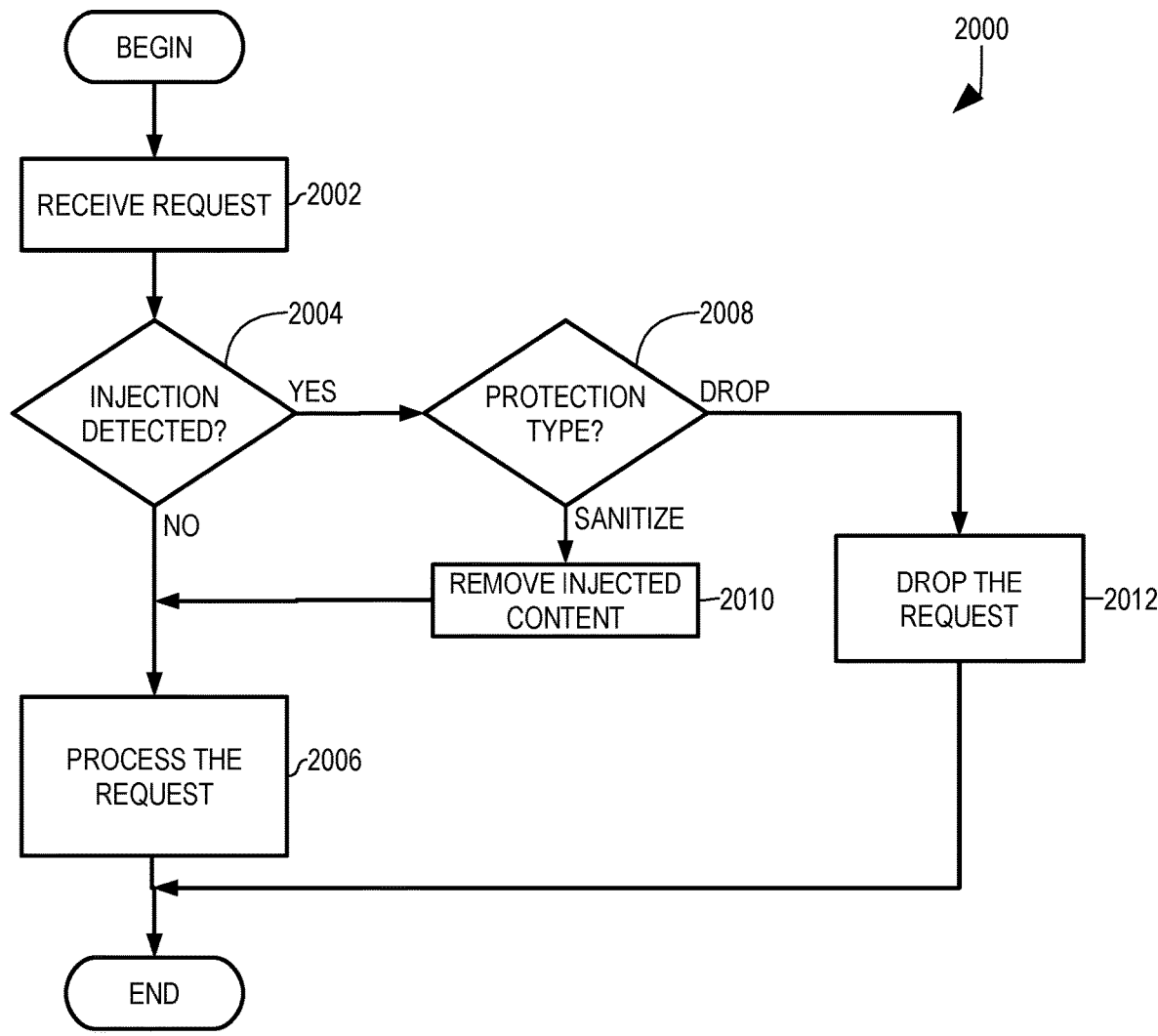
FIG. 20 is a logic flow diagram illustrating processing of requests that can include injection attacks according to protective action data in accordance with the present invention.

Protective behavior settings 1302 is shown in greater detail in FIG. 14 and includes primary protective behavior 1402. Primary protective behavior 1402 includes data that specifies the particular behavior taken by SQL request security logic 1202 when a threat is detected. The manner in which SQL request security logic 1202 processes injection attacks is shown as logic flow diagram 2000 (FIG. 20).

In step 2002, SQL request security logic 1202 receives a request, e.g., a SQL request in this illustrative embodiment. In test step 2004, SQL request security logic 1202 determines whether the request includes an injected attack in the manner described above. If not, SQL request security logic 1202 serves the request in step 2006 without modification.

Conversely, if SQL request security logic 1202 determines that the request includes an injected attack, processing transfer from test step 2004 to test step 2008. In test step 2008, SQL request security logic 1202 determines which type of responsive action is appropriate by reference to primary protective behavior 1402. In this illustrative embodiment, primary protective behavior 1402 specifies whether a request that includes an injected attack is to be sanitized or dropped.

If primary protective behavior 1402 specifies that a request that includes an injection attack is to be sanitized, processing transfers from test step 2008 to step 2010. In step 2010, SQL request security logic 1202 removes or renders inoperative the injected attack of the request in the manner described above, thus sanitizing the request. In step 2006, SQL request security logic 1202 serves the request as sanitized.

If primary protective behavior 1402 specifies that a request that includes an injection attack is to be dropped, processing transfers from test step 2008 to step 2012. In step 2012, SQL request security logic 1202 refuses to serve the request at all, in effect dropping the request, and returns an error in response to the request. After step 2006 or step 2012, processing according to logic flow diagram 2000 completes.

Thus, primary protective behavior 1402 allows SQL request security logic 1202 to be customized to either (i) attempt to serve requests infected with injected attacks in a safe manner or (ii) refuse to serve any such requests.

Protective behavior settings 1302 includes allowed data types 1404 which specifies one or more allowable types of requests that SQL request security logic 1202 will process. Multipurpose Internet Mail Extensions (MIME) is an Internet standard that specifies various data types and informs any logic accessing data how to interpret that data. For example, bytes in a given collection of data can represent text characters of a text document or color intensities of an image or metadata within the collection. Knowing the MIME type of a collection of data informs the interpretation of the data. Through allowed data types 1404, SQL request security logic 1202 can be configured to accept requests of certain types and to process such requests according to the particular data type of the request.

Figure 16:
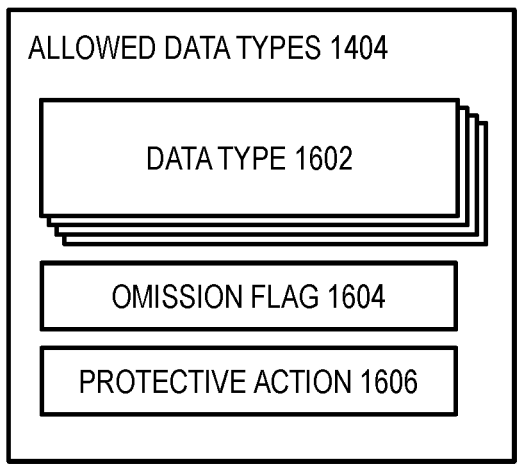
FIG. 16 is a block diagram showing allowed data types of FIG. 14 in greater detail.

Allowed data types 1404 is shown in greater detail in FIG. 16. Allowed data types 1404 includes one or more data types 1602, an omission flag 1604, and a protective action 1606. Each of data types 1602 specifies a data type (e.g., a MIME type) of request that can be processed by SQL request security logic 1202. Omission flag 1604 specifies whether SQL request security logic 1202 accepts requests in which the data type of the request is not specified. Protective action 1606 specifies the action to be taken by SQL request security logic 1202 regarding requests that are not of an allowed data type.

Figure 21:
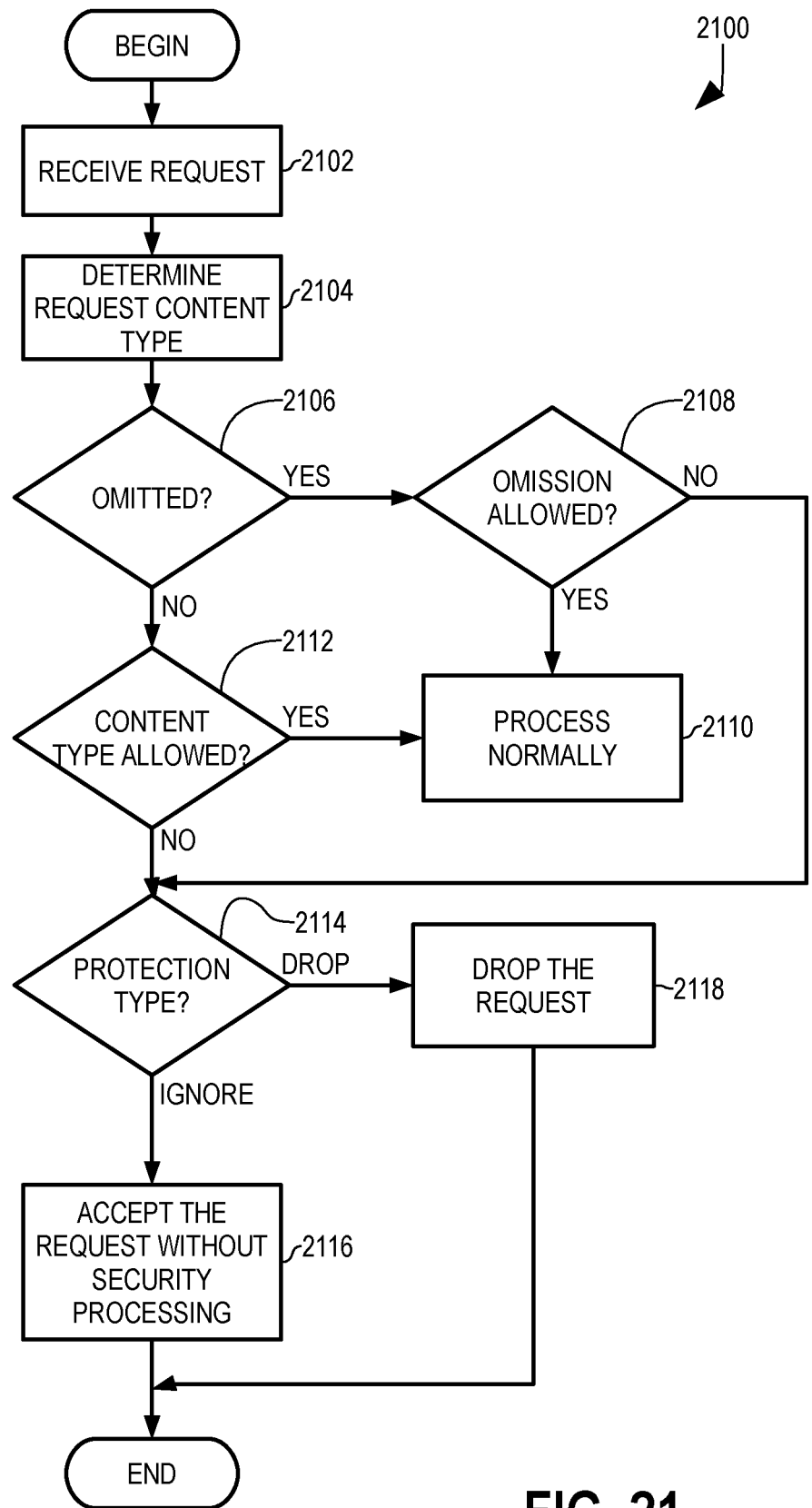
FIG. 21 is a logic flow diagram illustrating processing of requests that can include injection attacks according to allowed data types of FIG. 16 in accordance with the present invention.

The use of allowed data types 1404 by SQL request security logic 1202 is shown by logic flow diagram 2100 (FIG. 21). In step 2101, SQL request security logic 1202 receives an SQL request. In step 2014, SQL request security logic 1202 determines the data type of the request, typically by reference to metadata with which the request is transported to computer system 500 through a computer network.

In test step 2106, SQL request security logic 1202 determines whether the data type of the request is specified at all. If the data type is specified, processing transfers to step 2112, which is described below. Conversely, if the data type is not specified (i.e., is omitted), processing by SQL request security logic 1202 transfers to test step 2108. In test step 2108, SQL request security logic 1202 determines whether omission flag 1604 (FIG. 16) indicates that requests without an explicit data type are allowed. If so, processing transfers to step 2110 (FIG. 21) in which SQL request security logic 1202 processes the request in the manner described herein, e.g., as described in conjunction with logic flow diagram 2000 (FIG. 20). After step 2110, processing according to logic flow diagram 2100 completes.

Conversely, if omission flag 1604 (FIG. 16) indicates that requests without an explicit data type are not allowed, processing transfers to test step 2114 (FIG. 21) which is described more completely below.

As described above, processing transfers to test step 2112 if SQL request security logic 1202 determines in test step 2106 that the data type of the requested is specified. In test step 2112, SQL request security logic 1202 determines whether the data type of the request is specified by any of data types 1602 (FIG. 16) of allowed data types 1404. If so, SQL request security logic 1202 processes the request normally in step 2110 (FIG. 21) as described above and processing according to logic flow diagram 2100 completes.

Processing by SQL request security logic 1202 transfers to test step 2114 (*i*) from test step 2112 if the data type of the request is not specified by any of data types 1602 (FIG. 16) or (ii) from test step 2108 (FIG. 21) if the data type of the request is not specified at all and omission of the data type of the request is not permitted. Thus, at test step 2114, SQL request security logic 1202 will not be processing the request normally.

Protective action 1606 (FIG. 16) of allowed data types 1404 specifies the type of action to be taken by SQL request security logic 1202 in response to requests of an unapproved data type. In this illustrative embodiment, protective action 1606 can specify that such requests are to be dropped or ignored. If protective action 1606 specifies that requests of non-allowed data types are to be dropped, processing transfers to step 2118 in which SQL request security logic 1202 refuses to serve the request at all, in effect dropping the request, and returns an error in response to the request.

Conversely, if protective action 1606 specifies that requests of non-allowed data types are to be ignored, processing transfers to step 2116 in which SQL request security logic 1202 ignores the possibility of an injected attack in the request and serves the request as received without modification. After either of steps 2116 and 2118, processing according to logic flow diagram 2100 completes.

Thus, SQL request security logic 1202 can be configured to process requests of difference data types differently. In addition, while allowed data types 1404 (FIG. 16) includes a single protective action 1606 for all data types 1602, allowed data types 1404 can include a different protective action 1606 for each of data types 1602 and for requests with omitted data types.

It should be appreciated that each instance of SQL request security logic 1202 can be unique from all others. For example, whether a particular element of a request poses a risk of injection attack depends in large part on the manner in which the data element is processed in serving the request. In addition, valid and secure data in a given data element can be erroneously identified as an injection attack such that sanitizing the data element or dropping the request interferes with the proper serving of the request. SQL request security logic 1202 allows the processing of a request to be controlled at the data element level to enhance the ability of SQL request security logic 1202 to process valid and secure data elements that might otherwise be misidentified as including an injection or other attack. The manner in which SQL request security logic 1202 controls such processing at the data element level is described in conjunction with FIGS. 17 and 22.

Figure 17:
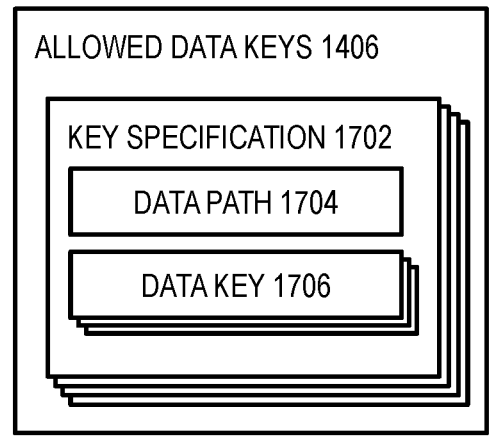
FIG. 17 is a block diagram showing allowed data keys of FIG. 14 in greater detail.

Protective behavior settings 1302 (FIG. 14) includes allowed data keys 1406, which is shown in greater detail in FIG. 17. It should be appreciated that the particular behavior of SQL request security logic 1202 controlling data elements operates on structured data in the form of structured data, e.g., associated key and value pairs. Very popular APIs today comply with REST or SOAP standards. APIs, REST, SOAP, JSON, and XML, are all known and well understood but are briefly described herein to facilitate appreciation and understanding of the present invention.

An API (application programming interface) defines the types of requests served by a particular service and the types of responses generated in response to such requests. A REST (REpresentational State Transfer) API exchanges requests and responses in a JSON (JavaScript Object Notation) format. The following is an example.

```
{  "user" :                                           (1)
   {  "username" : "John Doe" ,
      "password" : "John Doe' s secure password. " }
}
```

In JSON example (1), the data value of "John Doe" is associated with the data key of "username", the data value of "John Doe's secure password." is associated with the data key of "password", and those two key-value pairs are the data value associated with the data key "user".

A SOAP (Simple Object Access Protocol) API exchanges requests and responses in an XML (extensible markup language) format. The following is an example.

```
<user>                                                    (2)
  <username>John Doe</username>
  <password>John Doe' s secure password. </password>
</user>
```

XML example (2) specifies precisely the same key-value pairs of data specified by JSON example (1) above.

Allowed data keys 1406 (FIG. 17) includes one or more key specifications 1702. Each key specification 1702 includes a data path 1704 and one or more data keys 1706. Each request includes a data path that identifies a particular service requested. Within a given key specification 1702, data path 1704 specifies the path associated with data keys specified by data keys 1706. The following is an illustrative example of allowed data keys 1406 expressed as JSON.

```
" ignoredJSONKeys" : {                                    (3)
    "/login" : [ "username", "password" ],
    "/register" : [ "password" ],
    "/account/*" : [ "password" ],
    "/misc" : [ "user" ]
}
```

In JSON excerpt (3), allowed data keys 1406 includes four (4) key specifications 1702, one for each of the paths "/login", "/register", "/account/*", and "/misc". The key specification 1702 whose data path 1704 specifies the path "/login" includes a data key 1706 for "username" and a data key 1706 for "password".

Figure 22:
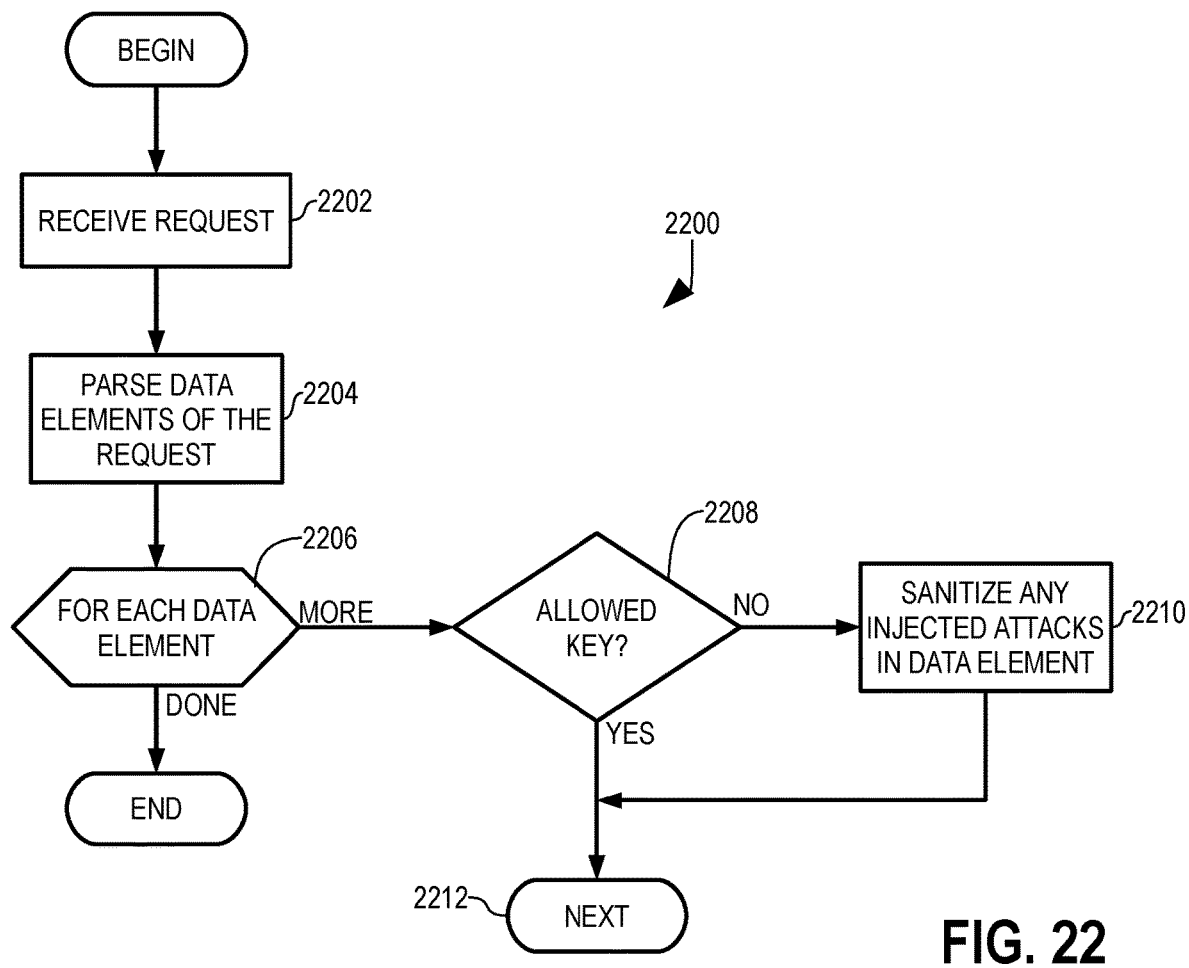
FIG. 22 is a logic flow diagram illustrating processing of requests that can include injection attacks according to allowed data keys of FIG. 17 in accordance with the present invention.
Figure 23:
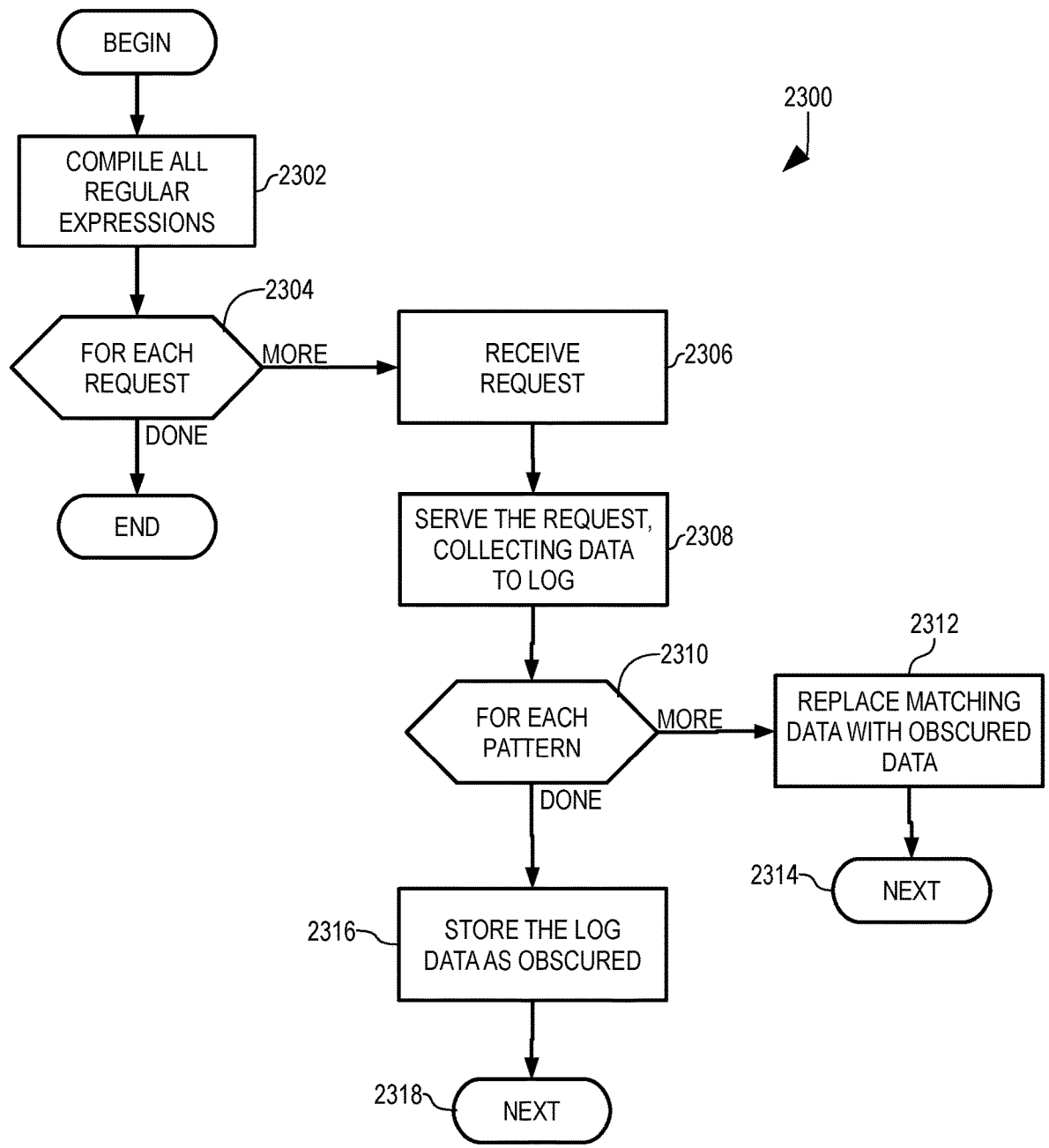
FIG. 23 is a logic flow diagram illustrating processing of requests that can include injection attacks and obscuring logged information according to masked data patterns of FIG. 18 in accordance with the present invention.

The processing of allowed data keys 1406 by SQL request security logic 1202 is illustrated by logic flow diagram 2200 (FIG. 22). In step 2202, SQL request security logic 1202 receives a request that includes structured data. In step 2204, SQL request security logic 1202 parses data elements of the request received in step 2202, which is sometimes referred to herein as the subject request.

Loop step 2206 and next step 2212 define a loop in which SQL request security logic 1202 processes each data element parsed from the request in step 2204 according to steps 2208-2210. During a given iteration of the loop of steps 2206-2212, the particular data element processed by SQL request security logic 1202 is referred to as the subject data element. For each data element parsed in step 2204, processing transfers from loop step 2206 to test step 2208.

In test step 2208, SQL request security logic 1202 determines whether the key of the subject data element is specified by any of key specifications 1702 (FIG. 17). In particular, SQL request security logic 1202 selects the key specification 1702 whose data path 1704 matches the path of the subject request and determines whether the key of the subject data element matches any of the data keys 1706 of the selected key specification 1702. For example, consider that the subject request specifies the path "/register" and allowed data keys 1406 is as described in the example of JSON excerpt (3). In structured data excepts (1) and (2), the data element with the key "password" is recognized by SQL request security logic 1202 as allowed and the data element with the key "username" is not.

If the subject data element is not specified by allowed data keys 1406, processing transfers to step 2210 (FIG. 22) in which SQL request security logic 1202 processes the subject data element to remove any detected injection attacks in the manner described above. After step 2210, processing transfers to next step 2212 and the next data element parsed from the subject request is processed according to the loop of steps 2206-2212.

Conversely, if the subject data element is specified by allowed data keys 1406, processing skips step 2210, and SQL request security logic 1202 allows the subject data element to remain exactly as received.

Once all data elements of the subject request have been processed by the loop of steps 2206-2212, processing according to logic flow diagram 2200 completes. Thus, allowed data keys 1406 (FIG. 17) enables an administrator of SQL request security logic 1202 to control, at the data element level, the specific behavior of SQL request security logic 1202.

As described above, security engine logs 1206 (FIG. 12) can be helpful in troubleshooting processing errors or answering questions by human users/clients as to what events might have transpired. In pursuits of each troubleshooting processing errors or answering such questions, it's not uncommon for security engine logs 1206 to be shared with people and/or computer systems tasked with these pursuit. Moreover, requests processed by SQL request security engine logic 1202 can include highly sensitive information that (i) is not required for such pursuits and (ii) should not be so widely distributed. Accordingly, obscuring such sensitive information in security engine logs 1206 can better protect such sensitive information and/or, by allowing wider distribution of security engine logs 1206, can significantly facilitate such pursuits.

Figure 15:
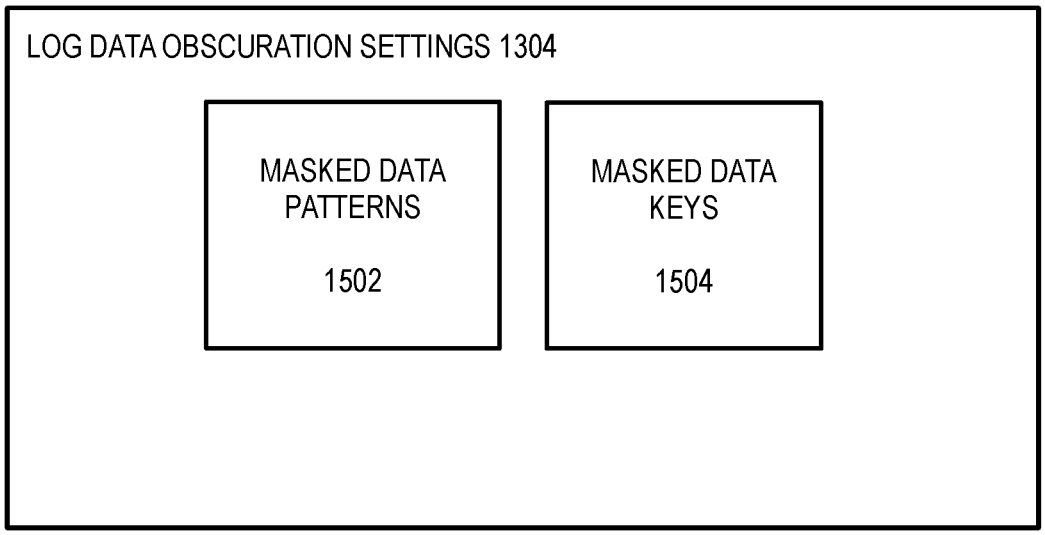
FIG. 15 is a block diagram showing log data obscuration settings of FIG. 13 in greater detail.

The manner in which SQL request security engine logic 1202 obscures sensitive information in security engine logs 1206 is controlled, in this illustrative embodiment, by log data obscuration settings 1304 (FIG. 13) of security engine configuration 1204. Log data obscuration settings 1304 is shown in greater detail in FIG. 15 and includes masked data patterns 1502 and masked data keys 1504. Masked data patterns 1502 specify patterns of data that are to be obscured in security engine logs 1206 wherever found. Masked data keys 1504 specify data to be obscured in security engine logs 1206 by specifying keys for which associated value data should be obscured.

Figure 18:
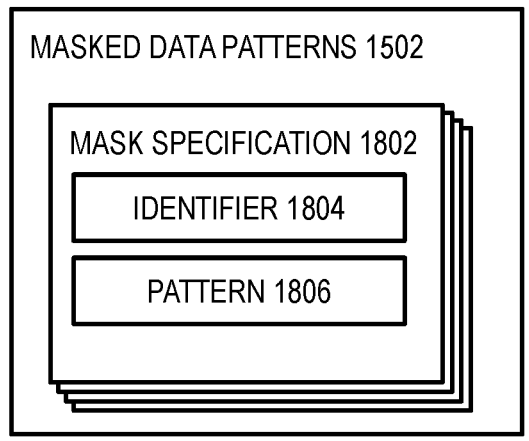
FIG. 18 is a block diagram showing masked data patterns of FIG. 15 in greater detail.

Masked data patterns 1502 is shown in greater detail in FIG. 18. Masked data patterns 1502 include one or more mask specifications 1802. Each mask specification 1802 includes an identifier 1804 and a pattern 1806. Pattern 1806 specifies a data pattern to be obscured. In this embodiment, the data pattern a regular expression. Regular expressions are known and well-understood but are described herein briefly to facilitate understanding and appreciation of the present invention.

Figure 12:
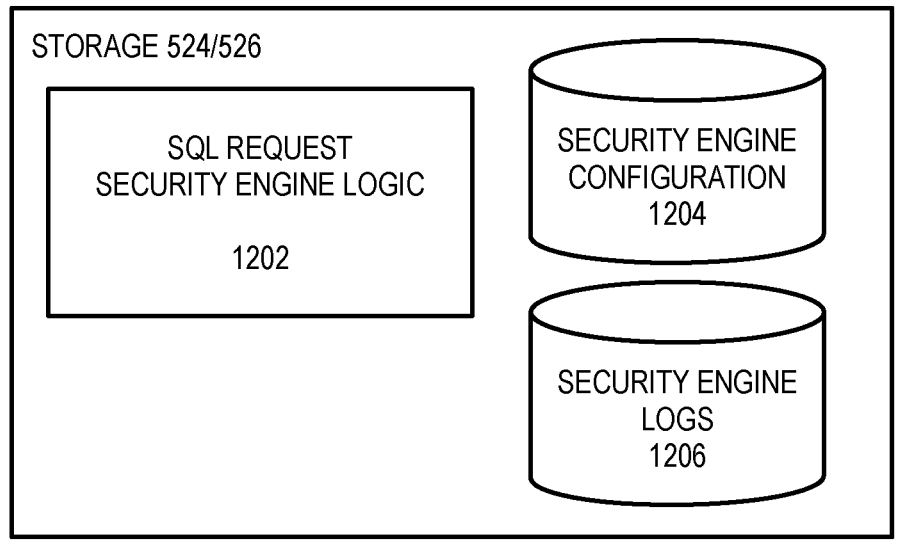
FIG. 12 is a block diagram showing logic and data stored in storage devices of the computer system shown in FIGS. 5A-B.

It is helpful to consider an illustrative example in which a mask specification 1802 is configured to cause SQL request security engine logic 1202 to mask social security numbers wherever they might appear in security engine logs 1206 (FIG. 12). The following is an example of an old-school regular expression that would correctly recognize and match U.S. social security numbers, which currently always include, in sequence, three (3) digits, a hyphen, two (2) digits, a hyphen, and four (4) digits.

$$\hat{}[0\text{-}9][0\text{-}9][0\text{-}9]\backslash\text{-}[0\text{-}9][0\text{-}9]\backslash\text{-}[0\text{-}9][0\text{-}9][0\text{-}9][0\text{-}9]\$ \qquad (4)$$

In regular expression (4), each "[0-9]" represents a single digit. The carat ("^") and dollar sign ("$") represent the start and end, respectively, of the data being compared for matching purposes. While the hyphen is used in "[0-9]" to indicate a range of values, the hyphens between the digits are escaped, e.g., preceded by a backslash ("\"), to remove this particular meaning. In others, "\-" refers to a hyphen literally and does not indicate a range between two values.

The following is an equivalent and more modern regular expression for matching U.S. social security numbers.

$$\char`\^\backslash d\{3\}-\backslash d\{2\}-\backslash d\{4\}\$ \qquad (5)$$

In regular expression (5), the carat and dollar sign have the same meaning as with regular expression (4). Backslash-d ("\d") represents a digit and is equivalent to "[0-9]". The curly brackets ("{" and "}") enclose a count specification. For example, "\d{3}" specifies a sequence of exactly three (3) digits. The hyphens in regular expression (5) need not be escaped by a backslash because the characters immediately preceding and following the hyphens are not literals but are instead special characters. For example, the curly brackets are not literals because they are not matched by curly brackets in the data being compared for matching purposes.

It should be appreciated that, while regular expressions are human-intelligible, they are not readily so. In particular, it takes some time for a human to author and recognize a regular expression. Accordingly, each pattern 1806 is associated with an identifier 1804. Identifier 1804 stores an identifier that indicates to a human user the particular nature of the data to be obscured. For example, regular expression (5) can be associated with an identifier of "SSN" to indicate to human users that regular expression (5) is included in masked data patterns 1502 to obscure any U.S. social security numbers that might otherwise be included in security engine logs 1206. If it is ever determined that obscuration of social security numbers is no longer required or if the particular format of social security numbers changes, the identifier of "SSN" while help a human engineer determine exactly which regular expression to change within masked data patterns 1502.

The manner in which SQL request security engine logic 1202 obscures log data in a manner specified by masked data patterns 1502 is illustrated by logic flow diagram 2300.

In step 2302, SQL request security engine logic 1202 compiles all regular expressions included in masked data patterns 1502. Compiling regular expressions is known. Briefly, compiling a regular expression translates the regular expression from a human-intelligible form to a form that can be processed more efficiently by a computer. Thus, compiling all regular expressions at the start improves efficiency. In addition, if any regular expression fails to compile properly, SQL request security engine logic 1202 identifies the regular expression as malformed and reports the malformed regular expression to a human administrator, e.g., by including a report of the malformed regular expression in security engine logs 1206 (FIG. 12).

Loop step 2304 and next step 2318 define a loop in which SQL request security engine logic 1202 processes each SQL request according to steps 2306-2316 until SQL request security engine logic 1202 is deactivated, e.g., by a human user. In step 2306, SQL request security logic 1202 receives a request for SQL access. The received request is sometimes referred to as the subject request in the context of an iteration of the loop of steps 2304-2318.

In step 2308, SQL request security engine logic 1202 serves the subject request, collecting data to store in security engine logs 1206 in the process.

Loop step 2310 and next step 2314 define a loop in which SQL request security engine logic 1202 processes each pattern 1806 of masked data patterns 1502 according to step 2312. During a given iteration of the loop of steps 2310-2314, the particular pattern processed by SQL request security engine 1202 is sometimes referred to as the subject pattern.

In step 2312, SQL request security engine logic 1202 replaces any data in the data to be logged that matches the subject pattern with obscured data. In this illustrative embodiment, the obscured data is four (4) asterisks: "**". For example, if some JSON data is to be logged and includes a key-value pair of '{"ssn": "123-45-6789"}', SQL request security engine logic 1202 recognizes that the value of the JSON data matches regular expression (5) above and replaces the value with obscured data, resulting in the obscured JSON data '{"ssn": "**"}'.

After step 2312, processing transfers through next step 2314 to loop step 2310 and SQL request security engine logic 1202 processes the next pattern. When all patterns have been processed by SQL request security engine logic 1202 according to the loop of steps 2310-2312, processing transfers to step 2316.

In step 2316, SQL request security engine logic 1202 stores the data collected in step 2308 and modified in one or more performances of step 2312 to security engine logs 1206. Thus, only data in which sensitive information is recorded in security engine logs 1206, enhancing the ability to more widely distribute such log data while maintaining the privacy of sensitive information.

As described above, log data obscuration settings 1304 include masked data keys 1504. Masked data keys 1504 are shown in greater detail in FIG. 19. Masked data keys 1504 include one or more key specifications 1902. Key specifications 1902 are generally of the structure described above with respect to key specifications 1702 (FIG. 17). The primary distinction between key specifications 1702 and key specifications 1902 (FIG. 19) is the manner in which the key specifications affect the behavior of SQL request security engine logic 1202. While key specifications 1702 (FIG. 17) affect the manner in which SQL request security engine logic 1202 defends against injection attacks, key specifications 1902 (FIG. 19) identify sensitive data that SQL request security engine logic 1202 is to obscure in security engine logs 1206. Key specifications 1902 each include a data path 1904 and one or more data keys 1906 which are directly analogous to data path 1904 and one or more data keys 1906 as described above.

Figure 24:
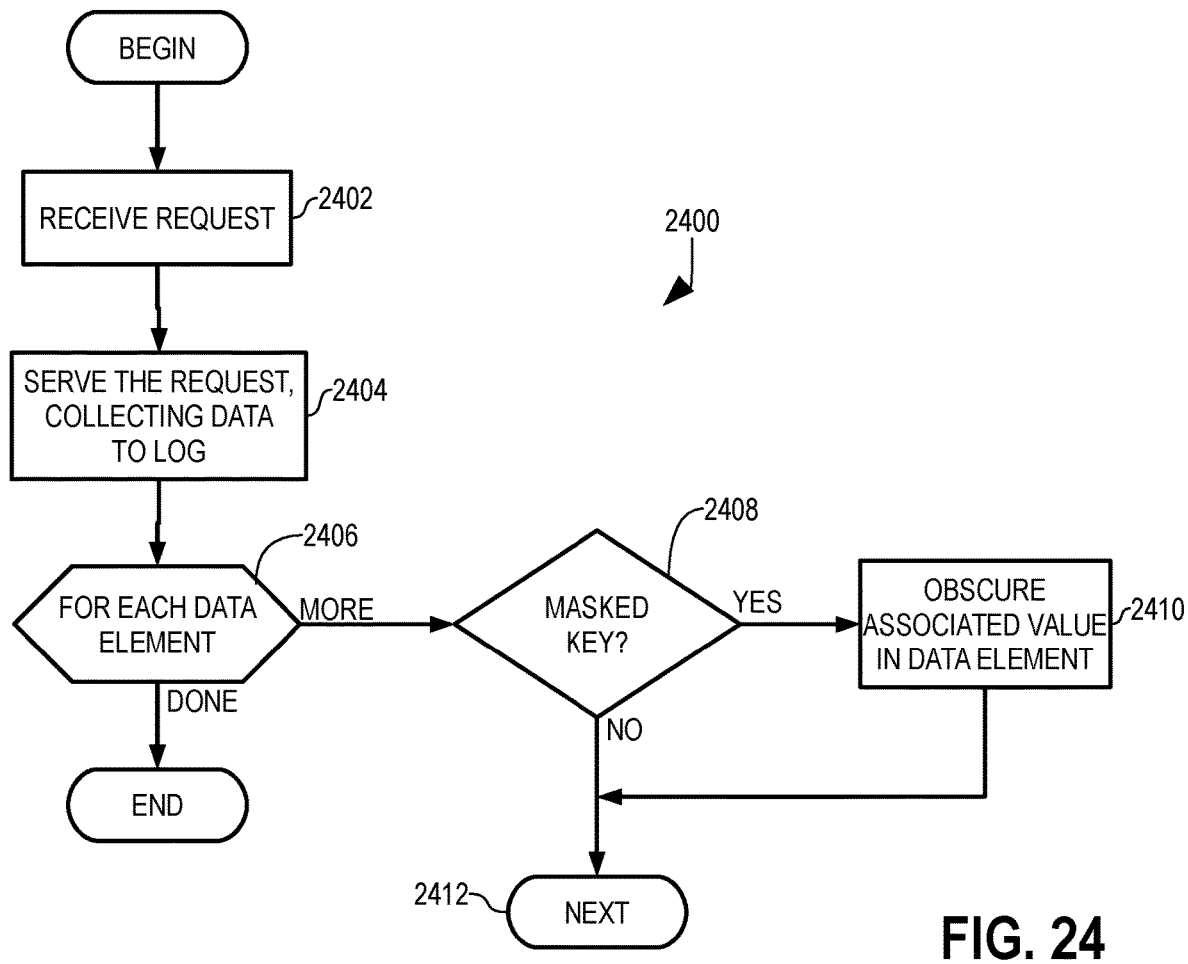
FIG. 24 is a logic flow diagram illustrating processing of requests that can include injection attacks and obscuring logged information according to masked data keys of FIG. 19 in accordance with the present invention.

The processing of masked data keys 1504 by SQL request security logic 1202 is illustrated by logic flow diagram 2400 (FIG. 24). In step 2402, SQL request security logic 1202 receives a request that includes structured data. In step 2404, SQL request security engine logic 1202 serves the subject request, collecting data to store in security engine logs 1206 in the process.

Loop step 2406 and next step 2412 define a loop in which SQL request security logic 1202 processes each data element collected in step 2404 according to steps 2408-2410. During a given iteration of the loop of steps 2406-2412, the particular data element processed by SQL request security logic 1202 is referred to as the subject data element. For each data element collected in step 2404, processing transfers from loop step 2406 to test step 2408.

Figure 19:
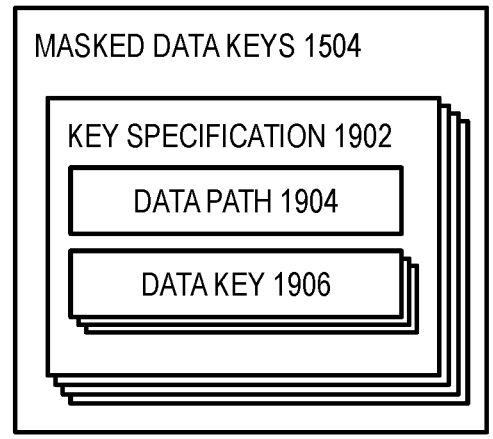
FIG. 19 is a block diagram showing masked data keys of FIG. 15 in greater detail.

In test step 2408, SQL request security logic 1202 determines whether the key of the subject data element is specified by any of key specifications 1902 (FIG. 19). In particular, SQL request security logic 1202 selects the key specification 1902 whose data path 1904 matches the path of the subject request and determines whether the key of the subject data element matches any of the data keys 1906 of the selected key specification 1902. For example, consider that the subject request specifies the path "/register" and masked data keys 1504 is as described in the example of JSON excerpt (3). In structured data excepts (1) and (2), the data element with the key "password" is recognized by SQL request security logic 1202 as masked and the data element with the key "username" is not.

If the subject data element is specified by masked data keys 1406, processing transfers to step 2410 (FIG. 24) in which SQL request security logic 1202 replaces any data in the associated value of the key-value pair of the subject data element with obscured data. In this illustrative embodiment, the obscured data is four (4) asterisks: "**". For example, obscuration of the JSON data of excerpt (1), obscuring the value of "password" and not the value of "username", results in the JSON data of '{"user": {"username": "John Doe", "password": ""}}'. After step 2410, processing transfers to next step 2412 and the next data element parsed from the collected data is processed according to the loop of steps 2406-2412. Conversely, if the subject data element is not specified by masked data keys 1504, processing skips step 2410, and SQL request security logic 1202** leaves the subject data element unobscured.

Once all data elements of the collected data have been processed by the loop of steps 2406-2412, processing according to logic flow diagram 2400 completes. Thus, masked data keys 1504 (FIG. 19) enables an administrator of SQL request security logic 1202 to control, at the data element level, the specific types of information in security engine logs 1206 (FIG. 12) obscured by SQL request security logic 1202.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A method for handing of injection attacks in requests for computer services, the method comprising:
receiving first request data that represents a first service to be provided by a server computer;
parsing first content-type data from the first request data wherein the first content-type data specifies a particular data type of at least a substantive portion of the first request data wherein the substantive portion of the first request data specifies the first service to be provided by the server computer;
determining whether the particular data type is one of one or more predetermined allowed data types based on accessing a list of data types included in protective behavior settings for a query security engine;
upon a condition in which the particular data type is one of the predetermined allowed data types, processing the first request data by performing the first service;
receiving second request data that is distinct from the first request data and that represents a second service to be provided by a server computer that is distinct from the first service;
determining that the second request data includes no content-type data that specifies a particular data type of at least a substantive portion of the second request data wherein the substantive portion of the second request data specifies the second service;
determining whether omission of content-type data from request data is permitted based on accessing an omission flag included in the protective behavior settings for the query security engine, wherein the omission flag indicates whether requests without an explicit data type are allowed; and
upon a condition in which omission of content-type data from request data is permitted, processing the second request data by performing the second service.

2. The method of claim 1 further comprising:
receiving third request data that is distinct from the first request data and the second request data, and that represents a third service to be provided by a server computer and that is distinct from the first service and the second service;
parsing second content-type data from the third request data wherein the second content-type data is distinct from the first content-type data and specifies a particular data type of at least a substantive portion of the third request data wherein the substantive portion of the third request data specifies the third service;
determining whether the particular data type of the third request data is one of the predetermined allowed data types based on accessing the allowed data types included in the protective behavior settings for the query security engine; and
upon a condition in which the particular data type of the third request data is not one of the predetermined allowed data types, refusing to process the third request data and not performing the third service.

3. A set of one or more non-transitory machine-readable storage media storing instructions which, when executed by one or more processors of a computer system, causes the computer system to perform operations for handling injection attacks in requests for computer services, the operations comprising:
receiving first request data that represents a first service to be provided by a server computer;
parsing first content-type data from the first request data wherein the first content-type data specifies a particular data type of at least a substantive portion of the first request data wherein the substantive portion of the first request data specifies the first service to be provided by the server computer;
determining whether the particular data type is one of one or more predetermined allowed data types based on accessing a list of data types included in protective behavior settings for a query security engine;
upon a condition in which the particular data type is one of the predetermined allowed data types, processing the first request data by performing the first service;
receiving second request data that is distinct from the first request data and that represents a second service to be provided by a server computer that is distinct from the first service;
determining that the second request data includes no content-type data that specifies a particular data type of at least a substantive portion of the second request data wherein the substantive portion of the second request data specifies the second service;
determining whether omission of content-type data from request data is permitted based on accessing an omission flag included in the protective behavior settings for the query security engine, wherein the omission flag indicates whether requests without an explicit data type are allowed; and upon a condition in which omission of content-type data from request data is permitted, processing the second request data by performing the second service.

4. The set of one or more non-transitory machine-readable storage media of claim 3, wherein the operations further comprise:

receiving third request data that is distinct from the first request data and the second request data, and that represents a third service to be provided by a server computer and that is distinct from the first service and the second service;

parsing second content-type data from the third request data wherein the second content-type data is distinct from the first content-type data and specifies a particular data type of at least a substantive portion of the third request data wherein the substantive portion of the third request data specifies the third service;

determining whether the particular data type of the third request data is one of the predetermined allowed data types based on accessing the allowed data types included in the protective behavior settings for the query security engine; and upon a condition in which the particular data type of the third request data is not one of the predetermined allowed data types, refusing to process the third request data and not performing the third service.

5. A computing system to handle injection attacks in requests for computer services, the computer system comprising:

one or more processors; and a non-transitory machine-readable storage medium having instructions stored therein, which when executed by the one or more processors, causes the computing system to:

receive first request data that represents a first service to be provided by a server computer;

parse first content-type data from the first request data wherein the first content-type data specifies a particular data type of at least a substantive portion of the first request data wherein the substantive portion of the first request data specifies the first service to be provided by the server computer;

determine whether the particular data type is one of one or more predetermined allowed data types based on accessing a list of data types included in protective behavior settings for a query security engine;

upon a condition in which the particular data type is one of the predetermined allowed data types, process the first request data by performing the first service;

receive second request data that is distinct from the first request data and that represents a second service to be provided by a server computer that is distinct from the first service;

determine that the second request data includes no content-type data that specifies a particular data type of at least a substantive portion of the second request data wherein the substantive portion of the second request data specifies the second service;

determine whether omission of content-type data from request data is permitted based on accessing an omission flag included in the protective behavior settings for the query security engine, wherein the omission flag indicates whether requests without an explicit data type are allowed; and upon a condition in which omission of content-type data from request data is permitted, process the second request data by performing the second service.

6. The computing system of claim 5, wherein the instructions, when executed by the one or more processors, further causes the computing system to:

receive third request data that is distinct from the first request data and the second request data, and that represents a third service to be provided by a server computer and that is distinct from the first service and the second service;

parse second content-type data from the third request data wherein the second content-type data is distinct from the first content-type data and specifies a particular data type of at least a substantive portion of the third request data wherein the substantive portion of the third request data specifies the third service;

determine whether the particular data type of the third request data is one of the predetermined allowed data types based on accessing the allowed data types included in the protective behavior settings for the query security engine; and upon a condition in which the particular data type of the third request data is not one of the predetermined allowed data types, refuse to process the third request data and not performing the third service.

* * * * *